(12) United States Patent
Heo et al.

(10) Patent No.: US 12,177,450 B2
(45) Date of Patent: *Dec. 24, 2024

(54) VIDEO ENCODING/DECODING METHOD AND APPARATUS FOR PERFORMING PDPC AND METHOD FOR TRANSMITTING BITSTREAM

(71) Applicant: LG Electronics Inc., Seoul (KR)

(72) Inventors: Jin Heo, Seoul (KR); Hyeong Moon Jang, Seoul (KR); Jangwon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/234,710

(22) Filed: Aug. 16, 2023

(65) Prior Publication Data

US 2023/0396772 A1 Dec. 7, 2023

Related U.S. Application Data

(63) Continuation of application No. 17/848,634, filed on Jun. 24, 2022, now Pat. No. 11,778,192, which is a
(Continued)

(51) Int. Cl.
*H04N 19/159* (2014.01)
*H04N 19/105* (2014.01)
(Continued)

(52) U.S. Cl.
CPC ......... *H04N 19/132* (2014.11); *H04N 19/105* (2014.11); *H04N 19/159* (2014.11); *H04N 19/176* (2014.11); *H04N 19/186* (2014.11)

(58) Field of Classification Search
None
See application file for complete search history.

(56) References Cited

U.S. PATENT DOCUMENTS 11,778,192 B2 * 10/2023 Heo ............... H04N 19/105

OTHER PUBLICATIONS

Bross et al., "CE3: Multiple reference line intra prediction (Test 1.1.1, 1.1.2, 1.1.3 and 1.1.4)," Joint Video Experts Team (JVET) of ITU-T SG 16 WP 3 and ISO/IEC JTC 1/SC 29/WG 11, Document: JVET-L0283-v2, 12th Meeting: Macao, CN, Oct. 3-12, 2018, 7 pages.

(Continued)

*Primary Examiner* — Christopher G Findley
(74) *Attorney, Agent, or Firm* — Fish & Richardson P.C.

(57) ABSTRACT

An image encoding/decoding method and apparatus include features of generating a prediction block by performing intra prediction on a current block, determining whether to apply position dependent intra prediction combination (PDPC) to the prediction block, and generating a final prediction block of the current block, by applying PDPC to the prediction block based on the determination. The determining whether to apply PDPC to the prediction block may include determining whether a size of the current block satisfies a predetermined condition. Based on the size of the current block satisfying the predetermined condition, it may be determined to apply PDPC to the prediction block. Based on the size of the current block not satisfying the predetermined condition, a determination of a color component of the current block may be skipped and it may be determined not to apply PDPC to the prediction block.

7 Claims, 14 Drawing Sheets

Related U.S. Application Data continuation of application No. PCT/KR2020/019091, filed on Dec. 24, 2020.

(60) Provisional application No. 62/953,886, filed on Dec. 26, 2019.

(51) Int. Cl.
*H04N 19/132* (2014.01)
*H04N 19/176* (2014.01)
*H04N 19/186* (2014.01)

(56) References Cited

OTHER PUBLICATIONS

Extended European Search Report in European Appln. No. 20908208.0, mailed on Nov. 20, 2023, 13 pages.

Filippov et al., "Non-CE3: On block size restrictions for PDPC," Joint Video Experts Team (JVET) of ITU-T SG 16 WP 3 and ISO/IEC JTC 1/SC 29/WG 11, Document: JVET-M0122-v4, 13th Meeting: Marrakech, MA, Jan. 9-18, 2019, 7 pages.

Li et al., "Non-CE3: block size restriction on PDPC," Joint Video Experts Team (JVET) of ITU-T SG 16 WP 3 and 1S0/IEC JTC 1/SC 29/WG 11, Document: JVET-M0814-v5, 13th Meeting: Marrakech, MA, Jan. 9-18, 2019, 3 pages.

* cited by examiner

FIG. 4
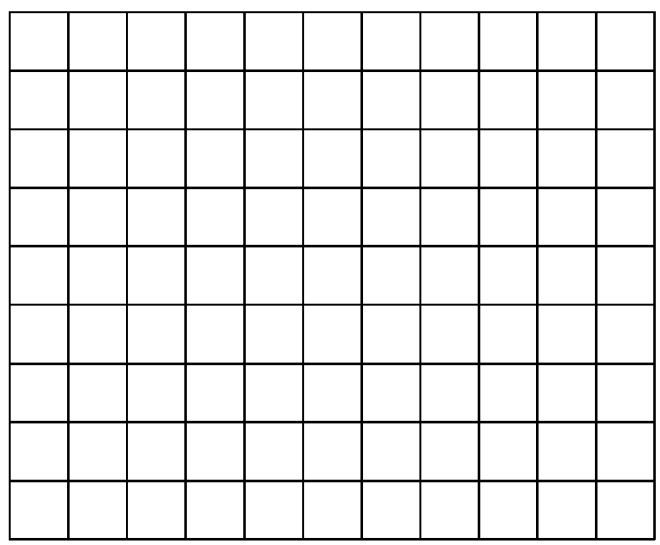
FIG. 5
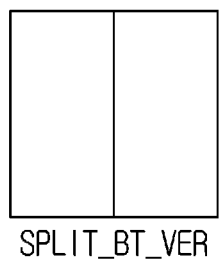 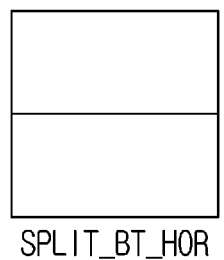 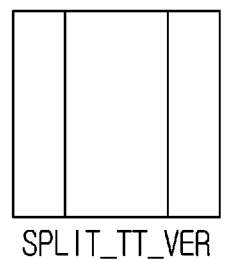 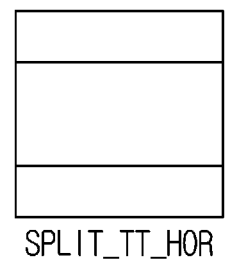
SPLIT_BT_VER    SPLIT_BT_HOR    SPLIT_TT_VER    SPLIT_TT_HOR

FIG. 14

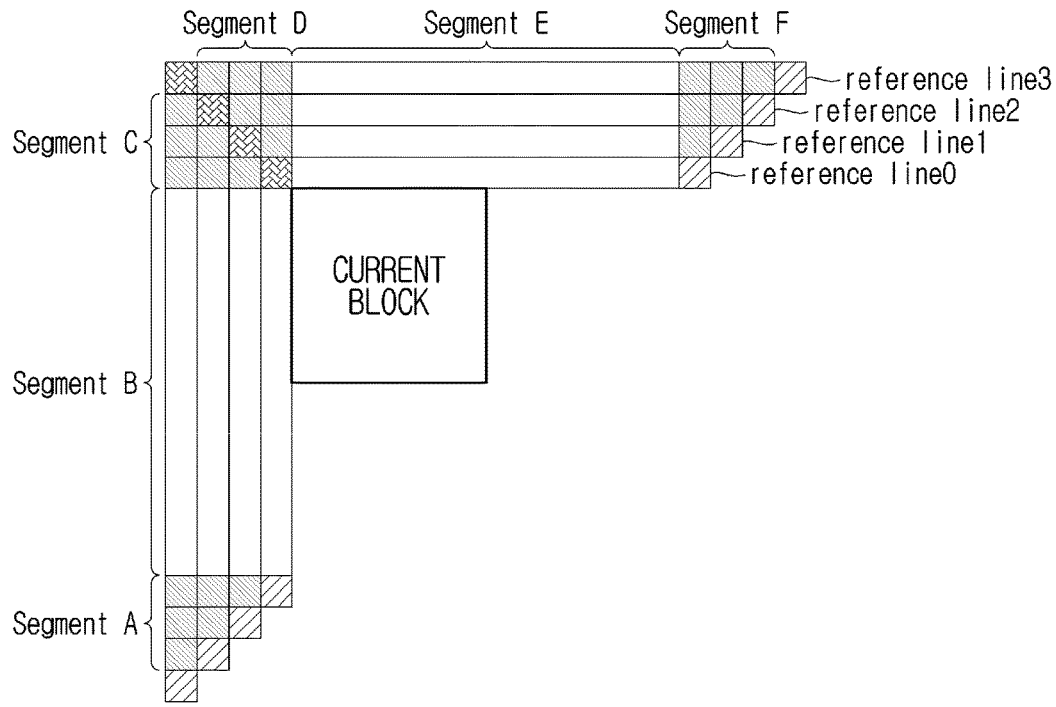

FIG. 15

| coding_unit( x0, y0, cbWidth, cbHeight, treeType ) { |
|---|
| ... |
|     if( sps_mrl_enabled_flag  &&   ( ( y0 % CtbSizeY ) > 0 ) ) |
|         intra_luma_ref_idx[ x0 ][ y0 ] |
|     if( sps_isp_enabled_flag  &&   intra_luma_ref_idx[ x0 ][ y0 ]   = =   0   && <br>       ( cbWidth  <=   MaxTbSizeY   &&   cbHeight  <=   MaxTbSizeY )   && <br>       ( cbWidth * cbHeight > MinTbSizeY * MinTbSizeY )   &&   !cu_act_enabled_flag ) |
|         intra_subpartitions_mode_flag[ x0 ][ y0 ] |
|     if( intra_subpartitions_mode_flag[ x0 ][ y0 ]   = =   1 ) |
|         intra_subpartitions_split_flag[ x0 ][ y0 ] |
|     if( intra_luma_ref_idx[ x0 ][ y0 ]   = =   0 ) |
|         intra_luma_mpm_flag[ x0 ][ y0 ] |
|     if( intra_luma_mpm_flag[ x0 ][ y0 ] ) { |
|         if( intra_luma_ref_idx[ x0 ][ y0 ]   = =   0 ) |
|             intra_luma_not_planar_flag[ x0 ][ y0 ] |
|         if( intra_luma_not_planar_flag[ x0 ][ y0 ] ) |
|             intra_luma_mpm_idx[ x0 ][ y0 ] |
|     } else |
|         intra_luma_mpm_remainder[ x0 ][ y0 ] |
|     } |
| ... |
| } |

FIG. 16

> When all of the following conditions are true, the position-dependent prediction sample filtering process (PDPC) is invoked with the intra prediction mode predModeIntra, the transform block width nTbW, the transform block height nTbH, the predicted samples predSamples[ x ][ y ], with x = 0..nTbW − 1, y = 0..nTbH − 1, the reference sample width refW, the reference sample height refH, and the reference samples p[ x ][ y ], with x = −1, y = −1..refH − 1 and x = 0..refW − 1, y = −1 as inputs, and the output is the modified predicted sample array predSamples:
>
> – nTbW is greater than or equal to 4 and nTbH is greater than or equal to 4 or cIdx is not equal to 0
>
> – refIdx is equal to 0 or cIdx is not equal to 0
>
> – BdpcmFlag[ xTbCmp ][ yTbCmp ][ cIdx ] is equal to 0
>
> – One of the following conditions is true:
>
>   - predModeIntra is equal to INTRA_PLANAR
>
>   - predModeIntra is equal to INTRA_DC
>
>   - predModeIntra is less than or equal to INTRA_ANGULAR18
>
>   - predModeIntra is greater than or equal to INTRA_ANGULAR50 and less than INTRA_LT_CCLM

FIG. 17

> When all of the following conditions are true, the position-dependent prediction sample filtering process (PDPC) is invoked with the intra prediction mode predModeIntra, the transform block width nTbW, the transform block height nTbH, the predicted samples predSamples[ x ][ y ], with x = 0..nTbW − 1, y = 0..nTbH − 1, the reference sample width refW, the reference sample height refH, and the reference samples p[ x ][ y ], with x = −1, y = −1..refH − 1 and x = 0..refW − 1, y = −1 as inputs, and the output is the modified predicted sample array predSamples:
>
> – nTbW is greater than or equal to 4 and nTbH is greater than or equal to 4
>
> – refIdx is equal to 0 or cIdx is not equal to 0
>
> – BdpcmFlag[ xTbCmp ][ yTbCmp ][ cIdx ] is equal to 0
>
> – One of the following conditions is true:
>
>   - predModeIntra is equal to INTRA_PLANAR
>
>   - predModeIntra is equal to INTRA_DC
>
>   - predModeIntra is less than or equal to INTRA_ANGULAR18
>
>   - predModeIntra is greater than or equal to INTRA_ANGULAR50 and less than INTRA_LT_CCLM

FIG. 18

When all of the following conditions are true, the position-dependent prediction sample filtering process (PDPC) is invoked with the intra prediction mode predModeIntra, the transform block width nTbW, the transform block height nTbH, the predicted samples predSamples[ x ][ y ], with x = 0..nTbW − 1, y = 0..nTbH − 1, the reference sample width refW, the reference sample height refH, and the reference samples p[ x ][ y ], with x = −1, y = −1..refH − 1 and x = 0..refW − 1, y = −1 as inputs, and the output is the modified predicted sample array predSamples:

– nTbW is greater than or equal to 4 and nTbH is greater than or equal to 4

– refIdx is equal to 0

– BdpcmFlag[ xTbCmp ][ yTbCmp ][ cIdx ] is equal to 0

– One of the following conditions is true:

- predModeIntra is equal to INTRA_PLANAR

- predModeIntra is equal to INTRA_DC

- predModeIntra is less than or equal to INTRA_ANGULAR18

- predModeIntra is greater than or equal to INTRA_ANGULAR50 and less than INTRA_LT_CCLM

FIG. 19

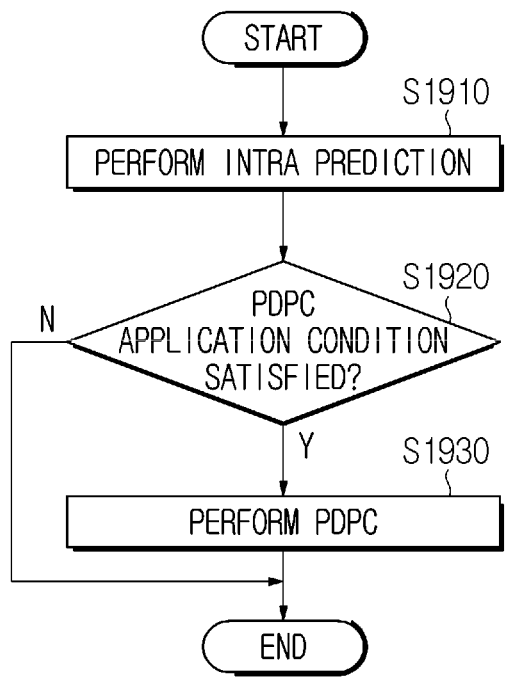

VIDEO ENCODING/DECODING METHOD AND APPARATUS FOR PERFORMING PDPC AND METHOD FOR TRANSMITTING BITSTREAM

CROSS-REFERENCE TO RELATED APPLICATIONS

This application is a continuation of U.S. application Ser. No. 17/848,634, filed on Jun. 24, 2022, which is a continuation pursuant to 35 U.S.C. § 119(e) of International Application PCT/KR2020/019091, with an international filing date of Dec. 24, 2020, which claims the benefit of U.S. Provisional Patent Application No. 62/953,886, filed on Dec. 26, 2019, the contents of which are hereby incorporated by reference herein in their entirety.

TECHNICAL FIELD

The present disclosure relates to an image encoding/decoding method and apparatus, and, more particularly, to an image encoding/decoding method and apparatus for performing position-dependent intra prediction (PDPC), and a method of transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Another object of the present disclosure is to provide an image encoding/decoding method and apparatus capable of improving encoding/decoding efficiency by making PDPC application requirements of a chroma block and a luma block the same.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method performed by an image decoding apparatus according to an aspect of the present disclosure may comprise generating a prediction block by performing intra prediction on a current block, determining whether to apply position dependent intra prediction combination (PDPC) to the prediction block, and generating a final prediction block of the current block, by applying PDPC to the prediction block based on the determination. The determining whether to apply PDPC to the prediction block may comprise determining whether a size of the current block satisfies a predetermined condition. Based on the size of the current block satisfying the predetermined condition, it may be determined to apply PDPC to the prediction block. Based on the size of the current block not satisfying the predetermined condition, a determination of a color component of the current block may be skipped and it may be determined not to apply PDPC to the prediction block.

In the image decoding method according to the present disclosure, the predetermined condition is that the size of the current block may be greater than or equal to a predetermined threshold.

In the image decoding method according to the present disclosure, based on a width of the current block being greater than or equal to the predetermined threshold and a height of the current block being greater to or equal to the predetermined threshold, the predetermined condition may be satisfied.

In the image decoding method according to the present disclosure, the predetermined threshold may be 4.

In the image decoding method according to the present disclosure, the determining whether to apply PDPC to the prediction block may further comprise a determination of a reference sample line used for intra prediction of the current block.

In the image decoding method according to the present disclosure, based on the reference sample line being a predetermined reference sample line, it may be determined to apply PDPC to the prediction block, and, based on the reference sample line being not the predetermined reference sample line, the determination of the color component of the current block may be skipped and it may be determined not to apply PDPC to the prediction block.

In the image decoding method according to the present disclosure, the predetermined reference sample line may be a first reference sample line adjacent to the current block.

In the image decoding method according to the present disclosure, the determining whether PDPC applies to the prediction block may further comprise a determination of whether block difference pulse code modulation (BDPCM) is applied to the current block and a determination of the intra prediction mode of the current block.

The image decoding method according to another aspect of the present disclosure may comprise a memory and at least one processor. The at least one processor may generate a prediction block by performing intra prediction on a current block, determine whether to apply position dependent intra prediction combination (PDPC) to the prediction block, and generate a final prediction block of the current block, by applying PDPC to the prediction block based on the determination. The determining whether to apply PDPC to the prediction block may comprise determining whether a size of the current block satisfies a predetermined condition. Based on the size of the current block satisfying the predetermined condition, it may be determined to apply PDPC to the prediction block. Based on the size of the current block not satisfying the predetermined condition, a determination of a color component of the current block may be skipped and it may be determined not to apply PDPC to the prediction block.

An image encoding method performed by an image encoding apparatus according to another aspect of the present disclosure may comprise generating a prediction block by performing intra prediction on a current block, determining whether to apply position dependent intra prediction combination (PDPC) to the prediction block, and generating a final prediction block of the current block, by applying PDPC to the prediction block based on the determination. The determining whether to apply PDPC to the prediction block may comprise determining whether a size of the current block satisfies a predetermined condition. Based on the size of the current block satisfying the predetermined condition, it may be determined to apply PDPC to the prediction block. Based on the size of the current block not satisfying the predetermined condition, a determination of a color component of the current block may be skipped and it may be determined not to apply PDPC to the prediction block.

In the image encoding method according to the present disclosure, the predetermined condition is that the size of the current block may be greater than or equal to a predetermined threshold.

In the image encoding method according to the present disclosure, based on a width of the current block being greater than or equal to the predetermined threshold and a height of the current block being greater to or equal to the predetermined threshold, the predetermined condition may be satisfied.

In the image encoding method according to the present disclosure, the predetermined threshold may be 4

In the image encoding method according to the present disclosure, the determining whether to apply PDPC to the prediction block may further comprise a determination of a reference sample line used for intra prediction of the current block.

In the image encoding method according to the present disclosure, based on the reference sample line being a predetermined reference sample line, it may be determined to apply PDPC to the prediction block, and, based on the reference sample line being not the predetermined reference sample line, the determination of the color component of the current block may be skipped and it may be determined not to apply PDPC to the prediction block.

In the image encoding method according to the present disclosure, the predetermined reference sample line may be a first reference sample line adjacent to the current block.

In the image encoding method according to the present disclosure, the determining whether to apply PDPC to the prediction block may further comprise a determination of whether block difference pulse code modulation (BDPCM) is applied to the current block and a determination of the intra prediction mode of the current block.

Also, a transmission method according to another aspect of the present disclosure may transmit a bitstream generated by an image encoding apparatus or method of the present disclosure.

In addition, a computer-readable recording medium according to another aspect of the present disclosure may store the bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

Also, according to the present disclosure, it is possible to provide an image encoding/decoding method and apparatus capable of improving encoding/decoding efficiency by simplifying a determination of whether to apply PDPC using a unified PDPC application condition for a luma component and a chroma component in intra prediction encoding/decoding.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 4 is a view showing a partitioning structure of an image according to an embodiment.

FIG. 5 is a view showing an embodiment of a partitioning type of a block according to a multi-type tree structure.

FIG. 14 is a view illustrating a reference sample line available in an MRL method.

FIG. 15 is a view illustrating a syntax structure of a coding unit for signaling the multi-reference line index.

FIG. 16 is a view illustrating PDPC application conditions according to an embodiment of the present disclosure.

FIG. 17 is a view illustrating PDPC applications conditions according to another embodiment of the present disclosure.

FIG. 18 is a view illustrating PDPC application conditions according to another embodiment of the present disclosure.

FIG. 19 is a view illustrating a method of generating a prediction block according to another embodiment of the present disclosure.

MODE FOR INVENTION

Figure 1:
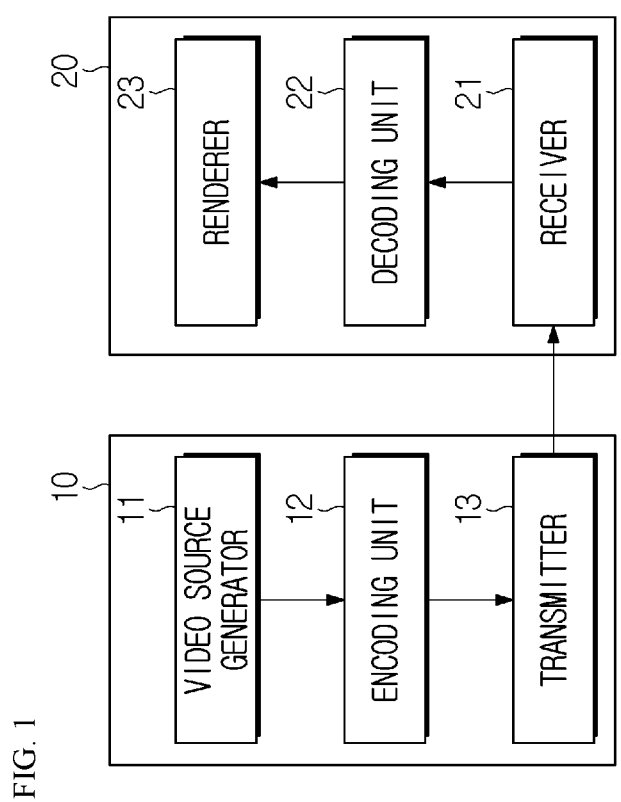
FIG. 1 is a view schematically showing a video coding system according to the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

A "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean "a luma block of a current block" unless explicitly stated as a chroma block. The "chroma block of the current block" may be expressed by including an explicit description of a chroma block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system according to the present disclosure.

The video coding system according to an embodiment may include an encoding device 10 and a decoding device 20. The encoding device 10 may deliver encoded video and/or image information or data to the decoding device 20 in the form of a file or streaming via a digital storage medium or network.

The source device 10 according to an embodiment may include a video source generator 11, an encoding unit 12 and a transmitter 13. The decoding device 20 according to an embodiment may include a receiver 21, a decoding unit 22 and a renderer 23. The encoding unit 12 may be called a video/image encoding device, and the decoding unit 22 may be called a video/image decoding device. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding device 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be di splayed through the display.

Overview of Image Encoding Apparatus

Figure 2:
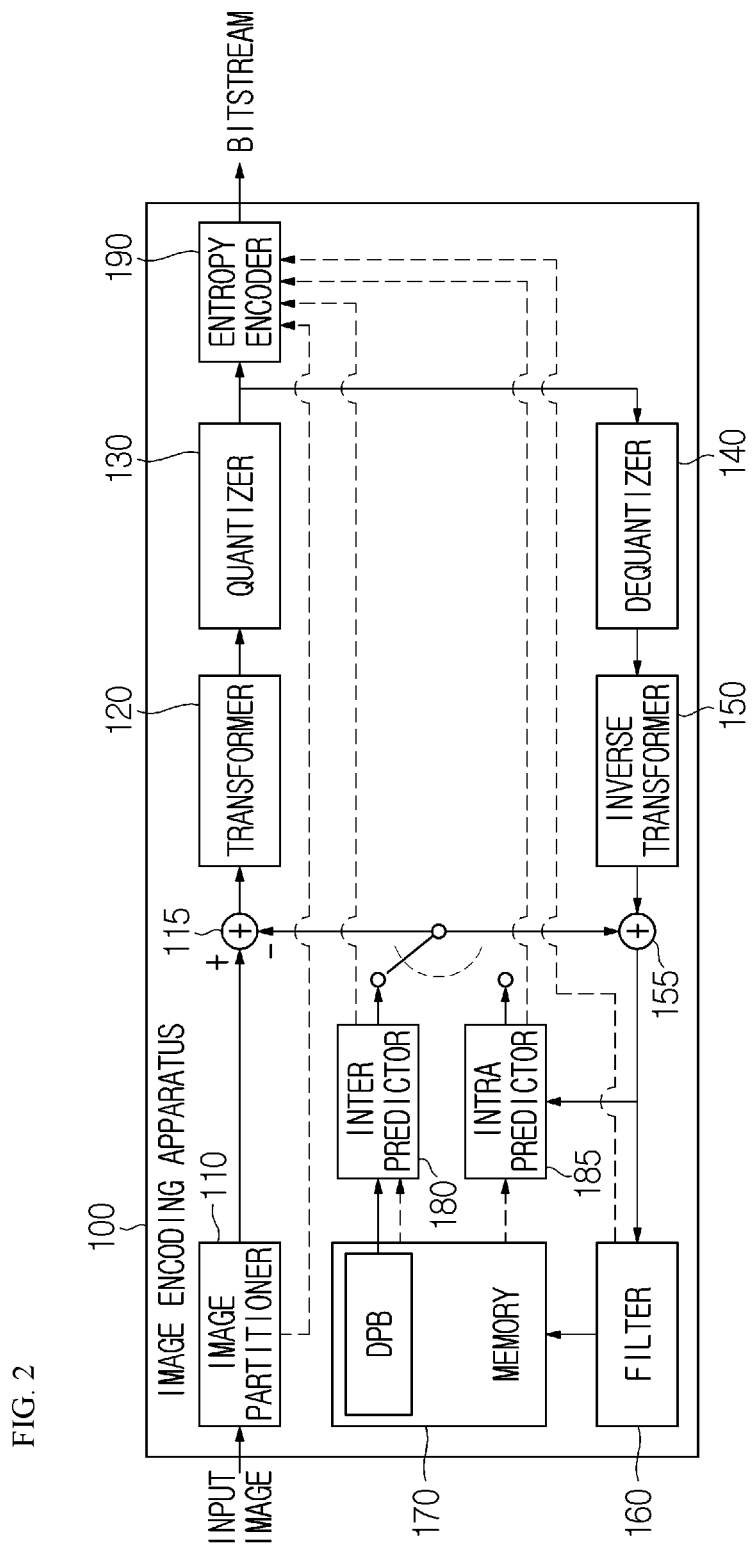
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding device 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding device 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding device 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block.

The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block type into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding device 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding device 100, prediction mismatch between the image encoding device 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
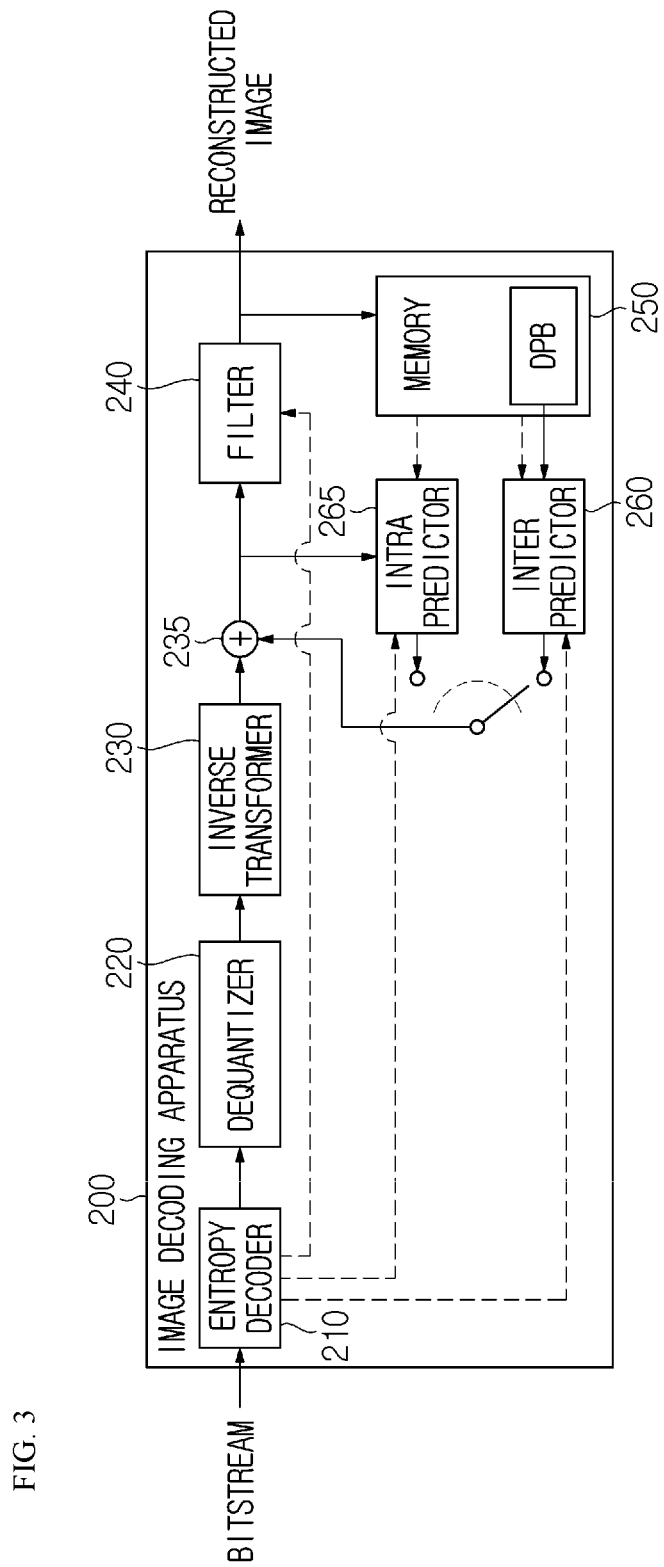
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding device 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding device 200 may be configured by a hardware component (e.g., a decoder or a processor) according to an embodiment. In addition, the memory 250 may include a decoded picture buffer (DPB) or may be configured by a digital storage medium.

The image decoding device 200, which has received a bitstream including video/image information, may reconstruct an image by performing a process corresponding to a process performed by the image encoding device 100 of FIG. 2. For example, the image decoding device 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding device 200 may be reproduced through a reproducing apparatus (not shown).

The image decoding device 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding device 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 160 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding device 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding device 100 may be equally or correspondingly applied to the filter 240, the inter prediction unit 260, and the intra prediction unit 265 of the image decoding device 200.

Overview of Image Partitioning

The video/image coding method according to the present disclosure may be performed based on an image partitioning structure as follows. Specifically, the procedures of prediction, residual processing ((inverse) transform, (de)quantization, etc.), syntax element coding, and filtering, which will be described later, may be performed based on a CTU, CU (and/or TU, PU) derived based on the image partitioning structure. The image may be partitioned in block units and the block partitioning procedure may be performed in the image partitioner 110 of the encoding apparatus. The partitioning related information may be encoded by the entropy encoder 190 and transmitted to the decoding apparatus in the form of a bitstream. The entropy decoder 210 of the decoding apparatus may derive a block partitioning structure of the current picture based on the partitioning related information obtained from the bitstream, and based on this, may perform a series of procedures (e.g., prediction, residual processing, block/picture reconstruction, in-loop filtering, etc.) for image decoding.

Pictures may be partitioned into a sequence of coding tree units (CTUs). FIG. 4 shows an example in which a picture is partitioned into CTUs. The CTU may correspond to a coding tree block (CTB). Alternatively, the CTU may include a coding tree block of luma samples and two coding tree blocks of corresponding chroma samples. For example, for a picture that contains three sample arrays, the CTU may include an N×N block of luma samples and two corresponding blocks of chroma samples.

Overview of Partitioning of CTU

As described above, the coding unit may be acquired by recursively partitioning the coding tree unit (CTU) or the largest coding unit (LCU) according to a quad-tree/binary-tree/ternary-tree (QT/BT/TT) structure. For example, the CTU may be first partitioned into quadtree structures. Thereafter, leaf nodes of the quadtree structure may be further partitioned by a multi-type tree structure.

Partitioning according to quadtree means that a current CU (or CTU) is partitioned into equally four. By partitioning according to quadtree, the current CU may be partitioned into four CUs having the same width and the same height. When the current CU is no longer partitioned into the quadtree structures, the current CU corresponds to the leaf node of the quad-tree structure. The CU corresponding to the leaf node of the quadtree structure may be no longer partitioned and may be used as the above-described final coding unit. Alternatively, the CU corresponding to the leaf node of the quadtree structure may be further partitioned by a multi-type tree structure.

FIG. 5 is a view showing an embodiment of a partitioning type of a block according to a multi-type tree structure. Partitioning according to the multi-type tree structure may include two types of splitting according to a binary tree structure and two types of splitting according to a ternary tree structure.

The two types of splitting according to the binary tree structure may include vertical binary splitting (SPLIT_BT_VER) and horizontal binary splitting (SPLIT_BT_HOR). Vertical binary splitting (SPLIT_BT_VER) means that the current CU is split into equally two in the vertical direction. As shown in FIG. 4, by vertical binary splitting, two CUs having the same height as the current CU and having a width which is half the width of the current CU may be generated. Horizontal binary splitting (SPLIT_BT_HOR) means that the current CU is split into equally two in the horizontal direction. As shown in FIG. 5, by horizontal binary splitting, two CUs having a height which is half the height of the current CU and having the same width as the current CU may be generated.

Two types of splitting according to the ternary tree structure may include vertical ternary splitting (SPLIT_TT_VER) and horizontal ternary splitting (SPLIT_TT_HOR). In vertical ternary splitting (SPLIT_TT_VER), the current CU is split in the vertical direction at a ratio of 1:2:1. As shown in FIG. 4, by vertical ternary splitting, two CUs having the same height as the current CU and having a width which is ¼ of the width of the current CU and a CU having the same height as the current CU and having a width which is half the width of the current CU may be generated. In horizontal ternary splitting (SPLIT_TT_HOR), the current CU is split in the horizontal direction at a ratio of 1:2:1. As shown in FIG. 5, by horizontal ternary splitting, two CUs having a height which is ¼ of the height of the current CU and having the same width as the current CU and a CU having a height which is half the height of the current CU and having the same width as the current CU may be generated.

Figure 6:
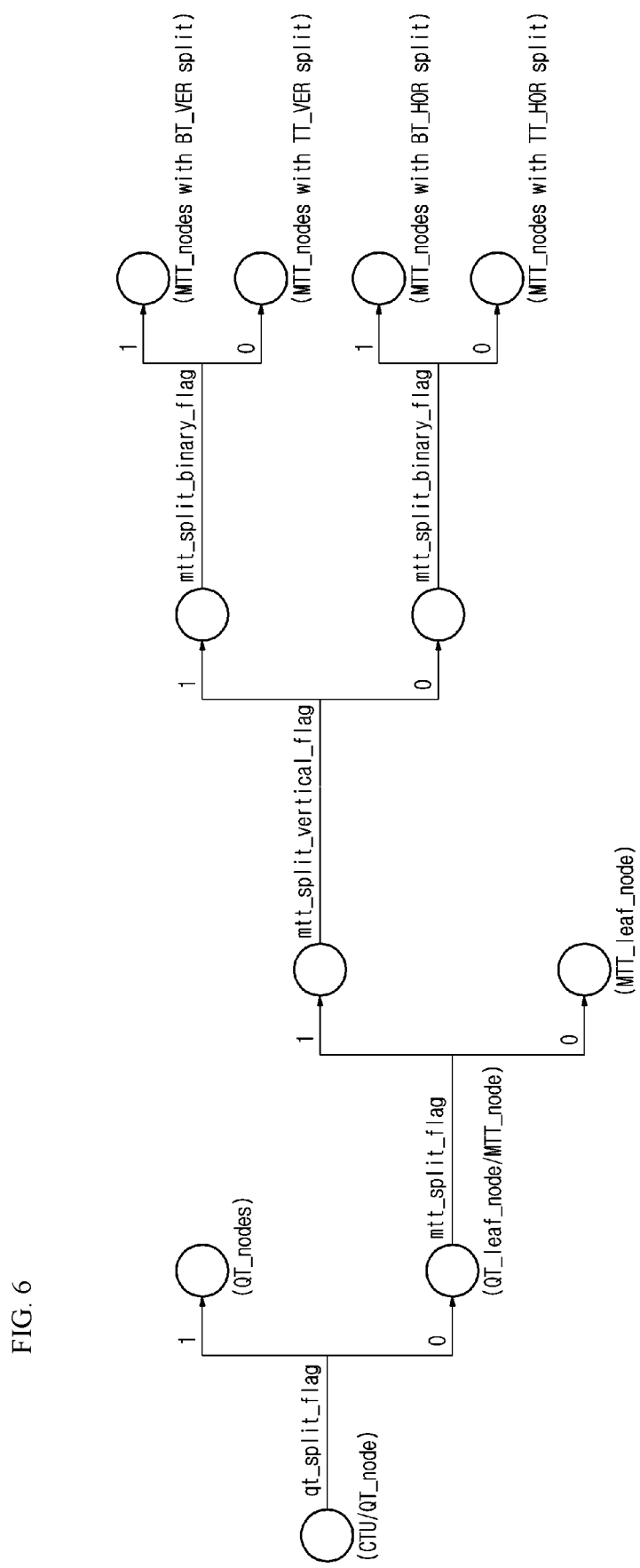
FIG. 6 is a view showing a signaling mechanism of block splitting information in a quadtree with nested multi-type tree structure according to the present disclosure.

FIG. 6 is a view showing a signaling mechanism of block splitting information in a quadtree with nested multi-type tree structure according to the present disclosure.

Here, the CTU is treated as the root node of the quadtree, and is partitioned for the first time into a quadtree structure. Information (e.g., qt_split_flag) indicating whether quadtree splitting is performed with respect to the current CU (CTU or node (QT_node) of the quadtree) may be signaled. For example, when qt_split_flag has a first value (e.g., "1"), the current CU may be quadtree-partitioned. In addition, when qt_split_flag has a second value (e.g., "0"), the current CU is not quadtree-partitioned, but becomes the leaf node (QT_leaf_node) of the quadtree. Each quadtree leaf node may then be further partitioned into multitype tree structures. That is, the leaf node of the quadtree may become the node (MTT_node) of the multi-type tree. In the multitype tree structure, a first flag (e.g., Mtt_split_cu_flag) may be signaled to indicate whether the current node is additionally partitioned. If the corresponding node is additionally partitioned (e.g., if the first flag is 1), a second flag (e.g., Mtt_split_cu_vertical_flag) may be signaled to indicate the splitting direction. For example, the splitting direction may be a vertical direction if the second flag is 1 and may be a horizontal direction if the second flag is 0. Then, a third flag (e.g., Mtt_split_cu_binary_flag) may be signaled to indicate whether the split type is a binary split type or a ternary split type. For example, the split type may be a binary split type when the third flag is 1 and may be a ternary split type when the third flag is 0. The node of the multi-type tree acquired by binary splitting or ternary splitting may be further partitioned into multi-type tree structures. However, the node of the multi-type tree may not be partitioned into quadtree structures. If the first flag is 0, the corresponding node of the multi-type tree is no longer split but becomes the leaf node (MTT_leaf_node) of the multi-type tree. The CU corresponding to the leaf node of the multi-type tree may be used as the above-described final coding unit.

Based on the mtt_split_cu_vertical_flag and the mtt_split_cu_binary_flag, a multi-type tree splitting mode (MttSplitMode) of a CU may be derived as shown in Table 1 below. In the following description, the multi-type tree splitting mode may be referred to as a multi-tree splitting type or splitting type.

TABLE 1

| MttSplitMode | mtt_split_cu_vertical_flag | mtt_split_cu_binary_flag |
| --- | --- | --- |
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

Figure 7:
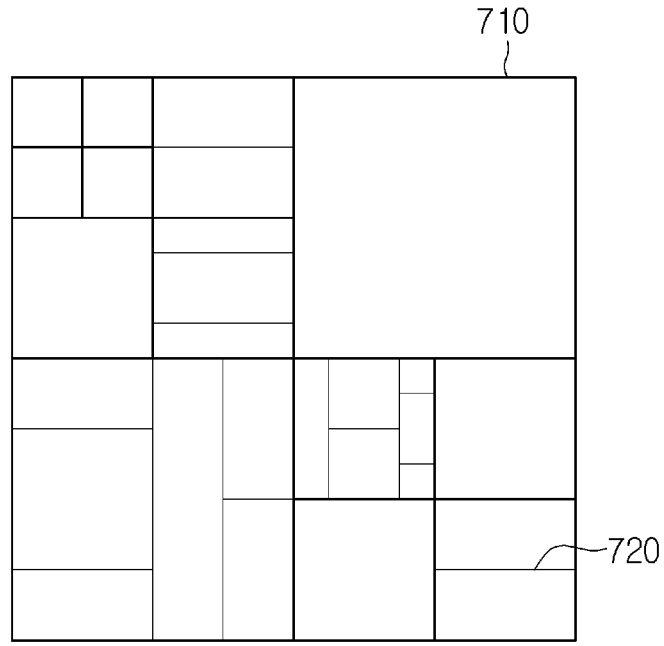
FIG. 7 is a view showing an embodiment in which a CTU is split into multiple CUs.

FIG. 7 is a view showing an example in which a CTU is partitioned into multiple CUs by applying a multi-type tree after applying a quadtree. In FIG. 7, bold block edges 710 represent quadtree partitioning and the remaining edges 720 represent multitype tree partitioning. The CU may correspond to a coding block (CB). In an embodiment, the CU may include a coding block of luma samples and two coding blocks of chroma samples corresponding to the luma samples.

A chroma component (sample) CB or TB size may be derived based on a luma component (sample) CB or TB size according to the component ratio according to the color format (chroma format, e.g., 4:4:4, 4:2:2, 4:2:0 or the like) of the picture/image. In case of 4:4:4 color format, the chroma component CB/TB size may be set equal to be luma component CB/TB size. In case of 4:2:2 color format, the width of the chroma component CB/TB may be set to half the width of the luma component CB/TB and the height of the chroma component CB/TB may be set to the height of the luma component CB/TB. In case of 4:2:0 color format, the width of the chroma component CB/TB may be set to half the width of the luma component CB/TB and the height of the chroma component CB/TB may be set to half the height of the luma component CB/TB.

In an embodiment, when the size of the CTU is 128 based on the luma sample unit, the size of the CU may have a size from 128×128 to 4×4 which is the same size as the CTU. In one embodiment, in case of 4:2:0 color format (or chroma format), a chroma CB size may have a size from 64×64 to 2×2.

Meanwhile, in an embodiment, the CU size and the TU size may be the same.

Alternatively, there may be a plurality of TUs in a CU region. The TU size generally may represent a luma component (sample) transform block (TB) size.

The TU size may be derived based a largest allowable TB size maxTbSize which is a predetermined value. For example, when the CU size is greater than maxTb Size, a plurality of TUs (TBs) having maxTb Size may be derived from the CU and transform/inverse transform may be performed in units of TU (TB). For example, the largest allowable luma TB size may be 64×64 and the largest allowable chroma TB size may be 32×32. If the width or height of the CB partitioned according to the tree structure is larger than the largest transform width or height, the CB may be automatically (or implicitly) partitioned until the TB size limit in the horizontal and vertical directions is satisfied.

In addition, for example, when intra prediction is applied, an intra prediction mode/type may be derived in units of CU (or CB) and a neighboring reference sample derivation and prediction sample generation procedure may be performed in units of TU (or TB). In this case, there may be one or a plurality of TUs (or TBs) in one CU (or CB) region and, in this case, the plurality of TUs or (TBs) may share the same intra prediction mode/type.

Meanwhile, for a quadtree coding tree scheme with nested multitype tree, the following parameters may be signaled as SPS syntax elements from the encoding apparatus to the decoding apparatus. For example, at least one of a CTU size which is a parameter representing the root node size of a quadtree, MinQTSize which is a parameter representing the minimum allowed quadtree leaf node size, MaxBtSize which is a parameter representing the maximum allowed binary tree root node size, MaxTtSize which is a parameter representing the maximum allowed ternary tree root node size, MaxMttDepth which is a parameter representing the maximum allowed hierarchy depth of multi-type tree splitting from a quadtree leaf node, MinBtSize which is a parameter representing the minimum allowed binary tree leaf node size, or MinTtSize which is a parameter representing the minimum allowed ternary tree leaf node size may be signaled.

As an embodiment of using 4:2:0 chroma format, the CTU size may be set to 128×128 luma blocks and two 64×64 chroma blocks corresponding to the luma blocks. In this case, MinOTSize may be set to 16×16, MaxBtSize may be set to 128×128, MaxTtSzie may be set to 64×64, MinBtSize and MinTtSize may be set to 4×4, and MaxMttDepth may be set to 4. Quadtree partitioning may be applied to the CTU to generate quadtree leaf nodes. The quadtree leaf node may be called a leaf QT node. Quadtree leaf nodes may have a size from a 16×16 size (e.g., the MinOTSize) to a 128×128 size (e.g., the CTU size). If the leaf QT node is 128×128, it may not be additionally partitioned into a binary tree/ternary tree. This is because, in this case, even if partitioned, it exceeds MaxBtsize and MaxTtszie (e.g., 64×64). In other cases, leaf QT nodes may be further partitioned into a multitype tree. Therefore, the leaf QT node is the root node for the multi-type tree, and the leaf QT node may have a multitype tree depth (mttDepth) 0 value. If the multitype tree depth reaches MaxMttdepth (e.g., 4), further partitioning may not be considered further. If the width of the multitype tree node is equal to MinBtSize and less than or equal to 2×MinTtSize, then no further horizontal partitioning may be considered. If the height of the multitype tree node is equal to MinBtSize and less than or equal to 2×MinTtSize, no further vertical partitioning may be considered. When partitioning is not considered, the encoding apparatus may skip signaling of partitioning information. In this case, the decoding apparatus may derive partitioning information with a predetermined value.

Meanwhile, one CTU may include a coding block of luma samples (hereinafter referred to as a "luma block") and two coding blocks of chroma samples corresponding thereto (hereinafter referred to as "chroma blocks"). The above-described coding tree scheme may be equally or separately applied to the luma block and chroma block of the current CU. Specifically, the luma and chroma blocks in one CTU may be partitioned into the same block tree structure and, in this case, the tree structure may be represented as SINGLE_TREE. Alternatively, the luma and chroma blocks in one CTU may be partitioned into separate block tree structures, and, in this case, the tree structure may be represented as DUAL_TREE. That is, when the CTU is partitioned into dual trees, the block tree structure for the luma block and the block tree structure for the chroma block may be separately present. In this case, the block tree structure for the luma block may be called DUAL_TREE_LUMA, and the block tree structure for the chroma component may be called DUAL_TREE_CHROMA. For P and B slice/tile groups, luma and chroma blocks in one CTU may be limited to have the same coding tree structure. However, for I slice/tile groups, luma and chroma blocks may have a separate block tree structure from each other. If the separate block tree structure is applied, the luma CTB may be partitioned into CUs based on a particular coding tree structure, and the chroma CTB may be partitioned into chroma CUs based on another coding tree structure. That is, this means that a CU in an I slice/tile group, to which the separate block tree structure is applied, may include a coding block of luma components or coding blocks of two chroma components and a CU of a P or B slice/tile group may include blocks of three color components (a luma component and two chroma components).

Although a quadtree coding tree structure with a nested multitype tree has been described, a structure in which a CU is partitioned is not limited thereto. For example, the BT structure and the TT structure may be interpreted as a concept included in a multiple partitioning tree (MPT) structure, and the CU may be interpreted as being partitioned through the QT structure and the MPT structure. In an example where the CU is partitioned through a QT structure and an MPT structure, a syntax element (e.g., MPT split type) including information on how many blocks the leaf node of the QT structure is partitioned into and a syntax element (ex. MPT_split_mode) including information on which of vertical and horizontal directions the leaf node of the QT structure is partitioned into may be signaled to determine a partitioning structure.

In another example, the CU may be partitioned in a different way than the QT structure, BT structure or TT structure. That is, unlike that the CU of the lower depth is partitioned into ¼ of the CU of the higher depth according to the QT structure, the CU of the lower depth is partitioned into ½ of the CU of the higher depth according to the BT structure, or the CU of the lower depth is partitioned into ¼ or ½ of the CU of the higher depth according to the TT structure, the CU of the lower depth may be partitioned into ⅕, ⅓, ⅜, ⅗, ⅔, or ⅝ of the CU of the higher depth in some cases, and the method of partitioning the CU is not limited thereto.

The quadtree coding block structure with the multi-type tree may provide a very flexible block partitioning structure. Because of the partition types supported in a multi-type tree, different partition patterns may potentially result in the same coding block structure in some cases. In the encoding apparatus and the decoding apparatus, by limiting the occurrence of such redundant partition patterns, a data amount of partitioning information may be reduced.

Hereinafter, intra prediction performed by an intra predictor will be described.

Intra Prediction

Intra prediction may represent prediction for generating prediction samples for a current block based on reference samples in a picture to which a current block belongs (hereinafter referred to as a current picture). When intra prediction applies to a current block, neighboring reference samples to be used for intra prediction of the current block may be derived. The neighboring reference samples of the current block may include a total of 2×nH samples adjacent to a left boundary of the current block having a size of nW×nH and samples adjacent to a bottom-left, a total of 2×nW samples adjacent to a top boundary of the current block and samples adjacent to a top-right, and one sample adjacent to a top-left of the current block. Alternatively, the neighboring reference samples of the current block may include a plurality of columns of top neighboring samples and a plurality of rows of left neighboring samples. In addition, the neighboring reference samples of the current block may include a total of nH samples adjacent to a right boundary of the current block having a size of nW×nH, a total of nW samples adjacent to a bottom boundary of the current block and one sample adjacent to a bottom-right of the current block.

However, some of the neighboring reference samples of the current block have not yet been decoded or may not be available. In this case, the decoding apparatus may construct neighboring reference samples to be used for prediction by substituting unavailable samples with available samples. Alternatively, neighboring reference samples to be used for prediction may be constructed through interpolation of available samples.

Hereinafter, an encoding method based on intra prediction and an intra prediction unit in an encoding apparatus will be described using FIGS. 8 and 9.

Figure 8:
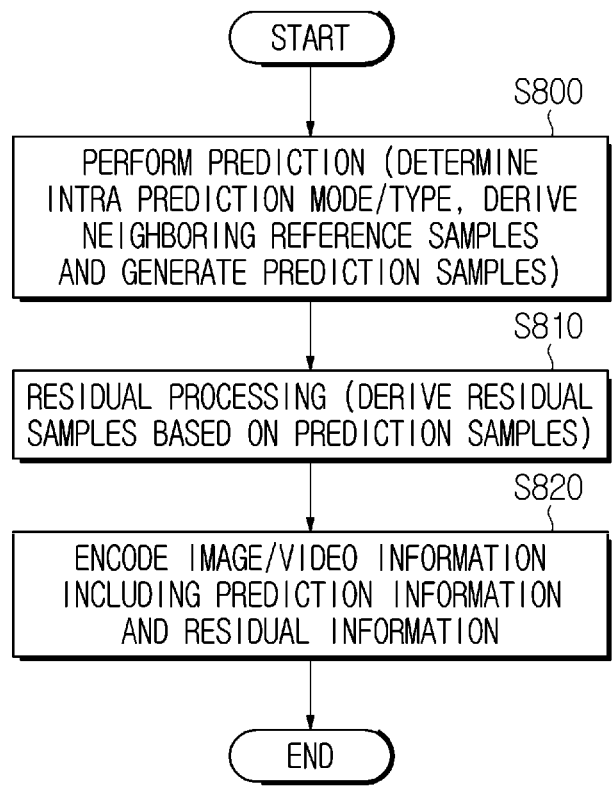
FIG. 8 is a view illustrating an intra prediction based video/image encoding method.
Figure 9:
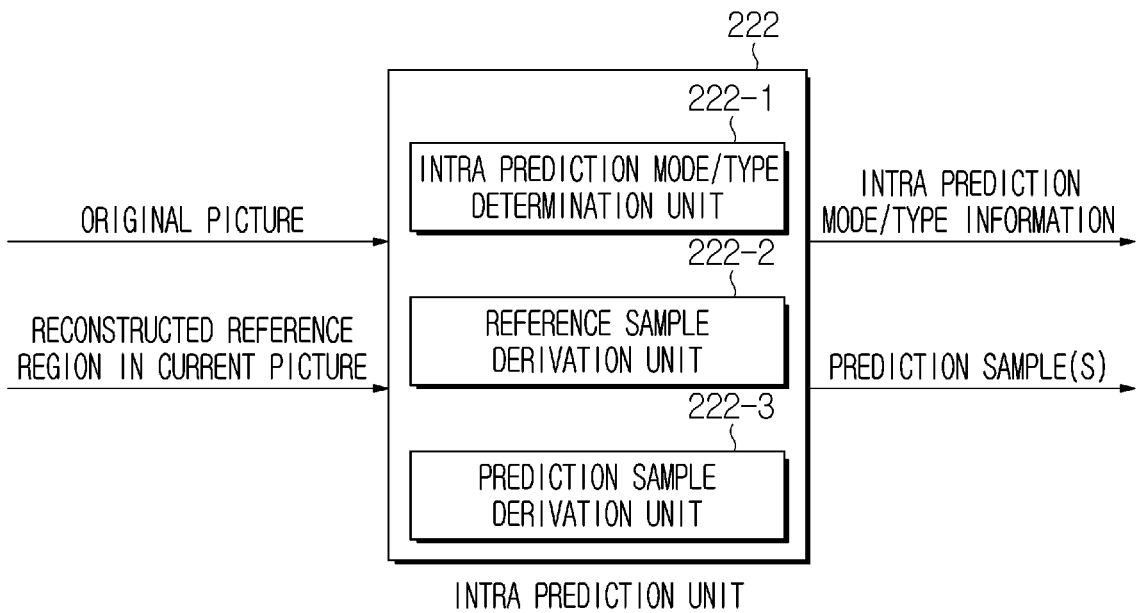
FIG. 9 is a view illustrating an intra prediction unit in an encoding apparatus.

FIG. 8 is a view illustrating an intra prediction based video/image encoding method. In addition, FIG. 9 is a view illustrating an intra prediction unit in an encoding apparatus.

S800 may be performed by the intra prediction unit 222 of the encoding apparatus, and S810 may be performed by the residual processor 230 of the encoding apparatus. Specifically, S820 may be performed by the subtractor 231 of the encoding apparatus. In S820, prediction information may be derived by the intra prediction unit 222, and may be encoded by the entropy encoder 240. In S820, residual information may be derived by the residual processor 230, and may be encoded by the entropy encoder 240. The residual information is information on residual samples. The residual information may include information on quantized transform coefficients for the residual samples. As described above, the residual samples may be derived as transform coefficients through the transformer 232 of the encoding apparatus, and the transform coefficients may be derived as quantized transform coefficients through the quantizer 233. Information on the quantized transform coefficients may be encoded by the entropy encoder 240 through a residual coding procedure.

The encoding apparatus may perform intra prediction with respect to the current block (S800). The encoding apparatus may derive an intra prediction mode/type for the current block, derive neighboring reference samples of the current block, and generate prediction samples in the current block based on the intra prediction mode/type and the neighboring reference samples. Here, a procedure for determining an intra prediction mode/type, a procedure for deriving neighboring reference samples and a procedure for generating prediction samples may be simultaneously performed, or any one procedure may be performed before another procedure. For example, the intra prediction unit 222 of the encoding apparatus may include an intra prediction mode/type determination unit 222-1, a reference sample derivation unit 222-2, a prediction sample derivation unit 222-3. The intra prediction mode/type determination unit 222-1 may determine the intra prediction mode/type for the current block, the reference sample derivation unit 222-2 may derive neighboring reference samples of the current block, and the prediction sample derivation unit 222-3 may derive the prediction samples of the current block. Meanwhile, although not shown, when the below-described prediction sample filtering procedure is performed, the intra prediction unit 222 may further include a prediction sample filter (not shown). The encoding apparatus may determine a mode/type applied to the current block from among a plurality of intra prediction modes/types. The encoding apparatus may compare RD costs of the intra prediction modes/types and determine an optimal intra prediction mode/type for the current block.

The encoding apparatus may generate residual samples for the current block based on prediction samples (S810). The encoding apparatus may compare the prediction samples from the original samples of the current block based on a phase and derive the residual samples.

The encoding apparatus may encode image information including information on intra prediction (prediction information) and residual information of the residual samples (S820). The prediction information may include the intra prediction mode information and the intra prediction type information. The encoding apparatus may output encoded image information in the form of a bitstream. The output bitstream may be transmitted to the decoding apparatus through a storage medium or a network.

The residual information may include a residual coding syntax described below. The encoding apparatus may transform/quantize the residual samples to derive quantized transform coefficients. The residual information may include information on the quantized transform coefficients.

Meanwhile, as described above, the encoding apparatus may generate a reconstructed picture (including reconstructed samples and a reconstructed block). To this end, the encoding apparatus may perform dequantization/inverse transform with respect to the quantized transform coefficients again to derive (modified) residual samples. The residual samples are transformed/quantized and then dequantized/inversely transformed, in order to derive the same residual samples as the residual samples derived in the decoding apparatus as described above. The encoding apparatus may generate a reconstructed block including the reconstructed samples for the current block based on the prediction samples and the (modified) residual samples. A reconstructed picture for the current picture may be generated based on the reconstructed block. As described above, an in-loop filtering procedure is further applicable to the reconstructed picture.

Hereinafter, an intra prediction based video/image decoding method and an intra prediction unit in a decoding apparatus will be described using FIGS. 10 and 11.

Figure 10:
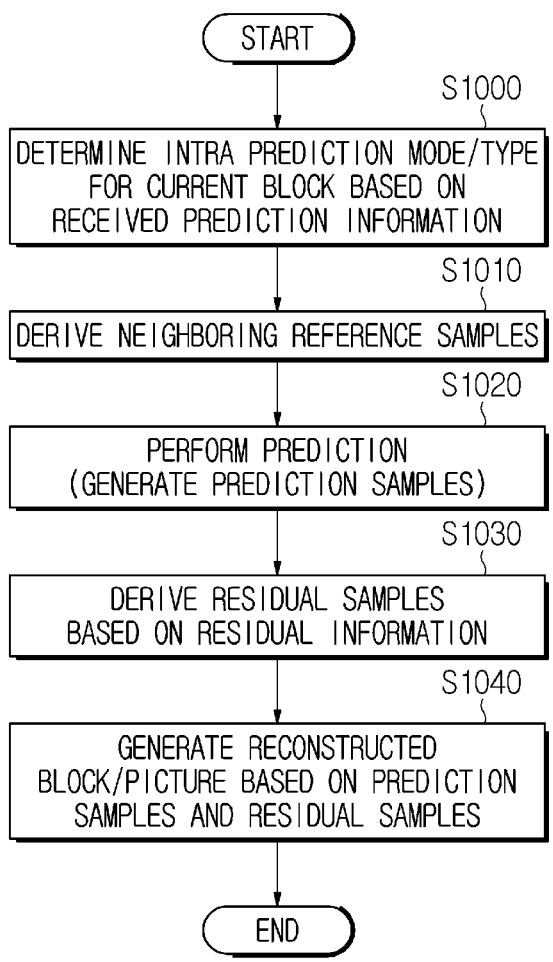
FIG. 10 is a view illustrating an intra prediction based video/image decoding method.
Figure 11:
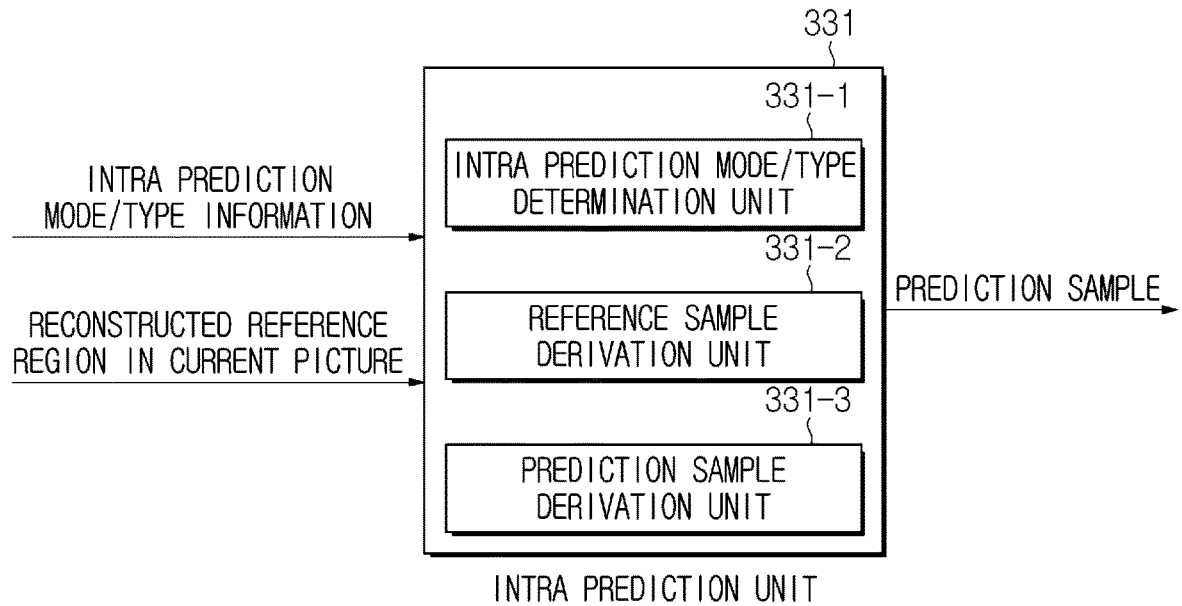
FIG. 11 is a view illustrating an intra prediction unit in a decoding apparatus.

FIG. 10 is a view illustrating an intra prediction based video/image decoding method. In addition, FIG. 11 is a view illustrating an intra prediction unit in a decoding apparatus.

The decoding apparatus may perform operation corresponding to operation performed in the encoding apparatus.

S1000 to S1020 may be performed by the intra prediction unit 331 of the decoding apparatus, and the prediction information of S1000 and the residual information of S1030 may be obtained from the bitstream by the entropy decoder 310 of the decoding apparatus. The residual processor 320 of the decoding apparatus may derive the residual samples for the current block based on the residual information. Specifically, the dequantizer 321 of the residual processor 320 may perform dequantization based on quantized transform coefficients derived based on the residual information to derive transform coefficients, and the dequantizer 322 of the residual processor may perform inverse transform with respect to the transform coefficients to derive the residual samples for the current block. S1040 may be performed by the adder 340 or the reconstructor of the decoding apparatus.

Specifically, the decoding apparatus may derive a intra prediction mode/type for the current block based on the received prediction information (intra prediction mode/type information) (S1000). The decoding apparatus may derive neighboring reference samples of the current block (S1010). The decoding apparatus generates prediction samples in the current blocks based on the intra prediction mode/type and the neighboring reference samples (S1020).

The decoding apparatus generates residual samples for the current block based on the received residual information. The decoding apparatus may generate reconstructed samples for the current block based on the prediction samples and the residual samples, and derive a reconstructed block including the reconstructed samples (S1030). A reconstructed picture for the current picture may be generated based on the reconstructed block. As described above, the in-loop filtering procedure is further applicable to the reconstructed picture.

Here, the intra prediction unit 331 of the decoding apparatus may include an intra prediction mode/type determination unit 331-1, a reference sample derivation unit 331-2 and a prediction sample derivation unit 331-3, the intra prediction mode/type determination unit 331-1 may determine the intra prediction mode/type for the current block based on the intra prediction mode/type information obtained by the entropy decoder 210, the reference sample derivation unit 331-2 may derive the neighboring reference samples of the current block, and the prediction sample derivation unit 331-3 may derive the prediction samples of the current block. Meanwhile, although not shown, when the above-described prediction sample filtering procedure is performed, the intra prediction unit 331 may further include a prediction sample filter (not shown).

The intra prediction mode information may include flag information (e.g., intra_luma_mpm_flag) specifying whether a most probable mode (MPM) or a remaining mode applies to the current block, and, when the MPM applies to the current block, the prediction mode information may further include index information (e.g., intra_luma_mpm_idx) specifying one of intra prediction mode candidates (MPM candidates). The intra prediction mode candidates (MPM candidates) may be configured as an MPM candidate list or an MPM list. In addition, when the MPM does not apply to the current block, the intra prediction mode information may further include remaining mode information (e.g., intra_luma_mpm_remainder) specifying one of the remaining intra prediction modes excluding the intra prediction mode candidates (MPM candidates). The decoding apparatus may determine the intra prediction mode of the current block based on the intra prediction mode information.

In addition, the intra prediction type information may be implemented in various forms. For example, the intra prediction type information may include intra prediction type index information specifying one of the intra prediction types. As another example, the intra prediction type information may include at least one of reference sample line information (e.g., intra_luma_ref_idx)) specifying whether the MRL applies to the current block and which reference sample line is used if applied, ISP flag information (e.g., intra_subpartitions_mode_flag) specifying whether the ISP applies to the current block, ISP type information (e.g., intra_subpartitions_split_flag) specifying the split type of subpartitions when the ISP applies, flag information specifying whether PDPC applies or flag information specifying whether LIP applies. In addition, the intra prediction type information may include an MIP flag specifying whether MIP applies to the current block.

The intra prediction mode information and/or the intra prediction type information may be encoded/decoded through the coding method described in the present disclosure. For example, the intra prediction mode information and/or the intra prediction type information may be encoded/decoded through entropy coding (e.g., CABAC or CAVLC) based on truncated (rice) binary code.

Figure 12:
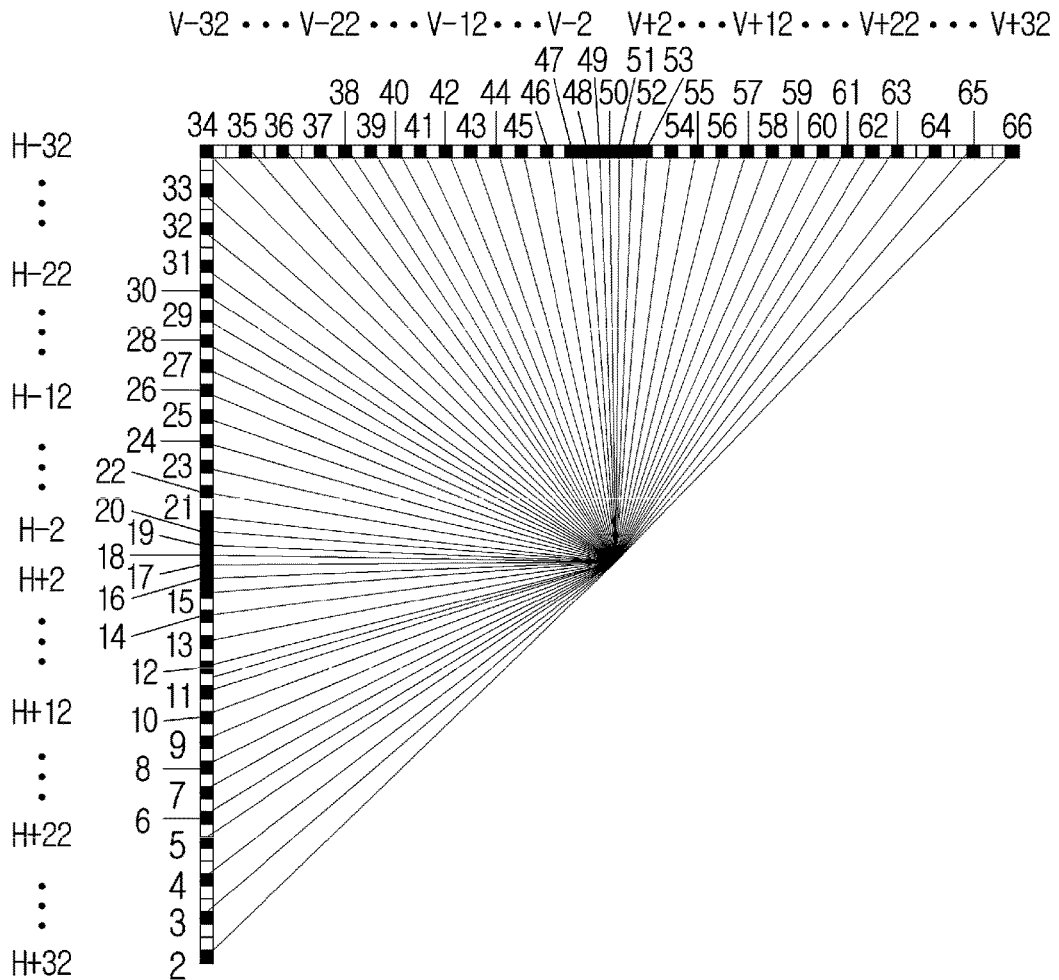
FIG. 12 is a view illustrating a directional intra prediction mode among intra prediction modes.

Meanwhile, intra prediction modes may include two directional intra prediction modes and 65 directional prediction modes. The non-directional intra prediction modes may include a planar intra prediction mode and a DC intra prediction mode, and the directional intra prediction modes may include intra prediction modes #2 to #66. An example of the directional intra prediction mode is shown in FIG. 12.

The intra prediction mode may further include a cross-component linear model (CCLM) mode for a chroma sample in addition to the above-described intra prediction modes. The CCLM mode may be classified into LT_CCLM, L_CCLM and T_CCLM depending on whether left samples, top samples or both thereof are considered for LM parameter derivation and may apply only to a chroma component.

The above-described intra prediction mode may be indexed, for example, as shown in Table 2 below.

TABLE 2

| Intra prediction mode | Associated name |
|---|---|
| 0 | INTRA_PLANAR |
| 1 | INTRA_DC |
| 2 . . . 66 | INTRA_ANGULAR2 . . . INTRA_ANGULAR66 |
| 81 . . . 83 | INTRA_LT_CCLM, INTRA_L_CCLM, INTRA_T_CCLM |

The prediction unit of the encoding/decoding apparatus may derive a reference sample according to an intra prediction mode of a current block among neighboring reference samples of the current block and generate a prediction sample of the current block based on the reference sample.

For example, the prediction sample may be derived based on an average or interpolation of neighboring reference samples of the current block, and (ii) the prediction sample may be derived based on a reference sample in a specific (prediction) direction for the prediction sample among neighboring reference samples of the current block. The case of (i) may be referred to as a non-directional mode or a non-angular mode and the case of (ii) may be referred to as a directional mode or an angular mode. In addition, the prediction sample may be generated through interpolation of the second neighboring sample and the first neighboring sample located in the opposite direction of the prediction direction of the intra prediction mode of the current block based on the prediction sample of the current block among the neighboring reference samples. The above-described case may be referred to as linear interpolation intra prediction (LIP). In addition, the prediction sample of the current block may be derived by deriving a temporary prediction sample of the current block based on filtered neighboring reference samples and weighted summing the existing neighboring reference samples, that is, at least one reference sample derived according to the intra prediction mode among unfiltered neighboring reference samples, and the temporary prediction sample. The above-described case may be referred to as position dependent intra prediction (PDPC). In addition, a reference sample line having highest prediction accuracy may be selected from among multiple neighboring reference sample lines of the current block, and the prediction sample may be derived using a reference sample located in a prediction direction in the corresponding line. In this case, intra prediction encoding may be performed using a method of instructing (signaling) the used reference sample line to a decoding apparatus. The above-described case may be referred to as multi-reference line intra prediction (MRL) or MRL based intra prediction. In addition, intra prediction may be performed based on the same intra prediction mode by partitioning the current block into vertical or horizontal subpartitions, and neighboring reference samples may be derived and used in units of subpartitions. That is, in this case, the intra prediction mode for the current block equally applies to the subpartitions, and, in some cases, intra prediction performance may be improved by deriving and using the neighboring reference sample in units of subpartitions. Details thereof will be described later. In addition, when a prediction direction based on a prediction sample indicates a point between neighboring reference samples, that is, when the prediction direction indicates a fractional sample position, a value of the prediction sample may be derived through interpolation of a plurality of reference samples located around the corresponding prediction direction (around the corresponding fractional sample position).

The above-described intra prediction methods may be referred to as an intra prediction type to be distinguished from the intra prediction mode. The intra prediction type may be referred to as various terms such as an intra prediction technique or an additional intra prediction mode. For example, the intra prediction type (or the additional intra prediction mode, etc.) may include at least one of the above-described LIP, PDPC, MRL and ISP. Information on the intra prediction type may be encoded and included in a bitstream in the encoding apparatus and signaled to the decoding apparatus. The information on the intra prediction type may be implemented in various forms such as flag information specifying whether to apply each intra prediction type or index information specifying one of several intra prediction types.

Hereinafter, PDPC related to the present disclosure among the above-described intra prediction types will be described.

Position Dependent Intra Prediction (PDPC)

PDPC may represent an intra prediction method of deriving a prediction sample of a current block, by performing filtering based on a filter for PDPC to derive filtered reference samples, deriving a temporary prediction sample of the current block based on an intra prediction mode of the current block and the filtered reference samples, and weighted summing at least one reference sample derived according to the intra prediction mode among the existing reference samples, that is, the unfiltered reference samples, and the temporary prediction sample. Here, the predefined filter may be one of five 7-tap filters. Alternatively, the predefined filter may be one of a 3-tap filter, a 5-tap filter and a 7-tap filter. The 3-tap filter, the 5-tap filter and the 7-tap filter may represent a filter having three filter coefficients, a filter having five filter coefficients and a filter having seven filter coefficients.

For example, a prediction result of an intra planar mode may be further modified by PDPC.

Alternatively, for example, PDPC may be applied for an intra planar mode, an intra DC mode, a horizontal intra prediction mode, a vertical intra prediction mode, an intra prediction mode (that is, intra prediction mode #2) in a bottom-left direction, eight directional intra prediction modes adjacent to the intra prediction mode in the bottom-left direction, an intra prediction mode in a top-right direction and eight directional intra prediction modes adjacent to the intra prediction mode in the top-right direction without separate signalling.

Specifically, when PDPC is applied, a prediction sample of (x, y) coordinates predicted based on a linear combination of reference samples and an intra prediction mode may be derived as shown in Equation 1 below.

$$\text{pred}(x,y)=(wL \times R_{(-1,y)}+wT \times R_{(x,-1)}-wTL \times R_{(-1,-1)}+ (64-wL-wT+wTL) \times \text{pred}(x,y)+32)>>6 \quad \text{[Equation 1]}$$

pred(x,y) of the left term of Equation 1 above specifies a prediction sample value of a (x, y) coordinate, and pred(x,y) of the right term specifies a temporary (primary) prediction sample value of the (x,y) coordinate. $R_{(x,-1)}$ and $R_{(-1,y)}$ respectively specify a top reference sample and a left reference sample located on the upper and left sides of the current sample of the (x, y) coordinate, and $R_{(-1,-1)}$ specifies a top-left reference sample located on a top-left corner of the current block. In addition, wL specifies a weight applied to a left reference sample, wT specifies a weight applied to a top reference sample, and wTL specifies a weight applied to a top-left reference sample.

Meanwhile, when PDPC is applied for an intra planar mode, an intra DC mode, a horizontal intra prediction mode and a vertical intra prediction mode, additional boundary filters such as a conventional DC mode boundary filter or a vertical/horizontal mode edge mode may not be required.

The temporary (primary) prediction sample may be generated as a result of performing intra prediction based on reference samples and the intra prediction mode of the current block. When PDPC is applied to the current block, for example, based on Equation 1 above, a final prediction sample of the current block may be generated. When PDPC is not applied to the current block, the temporary (primary) prediction sample may be used as the final prediction sample of the current block.

FIGS. 13A to 13D are views illustrating reference samples defined in PDPC.

In FIGS. 13A to 13D, pred(x, y) specifies a prediction sample (the above-described temporary prediction sample) obtained through intra prediction, and $R_{(x,-1)}$ and $R_{(-1,y)}$ respectively specify a top reference sample and a left reference sample located on the upper and left side of the current sample of (x, y) coordinate.

Figure 13A:
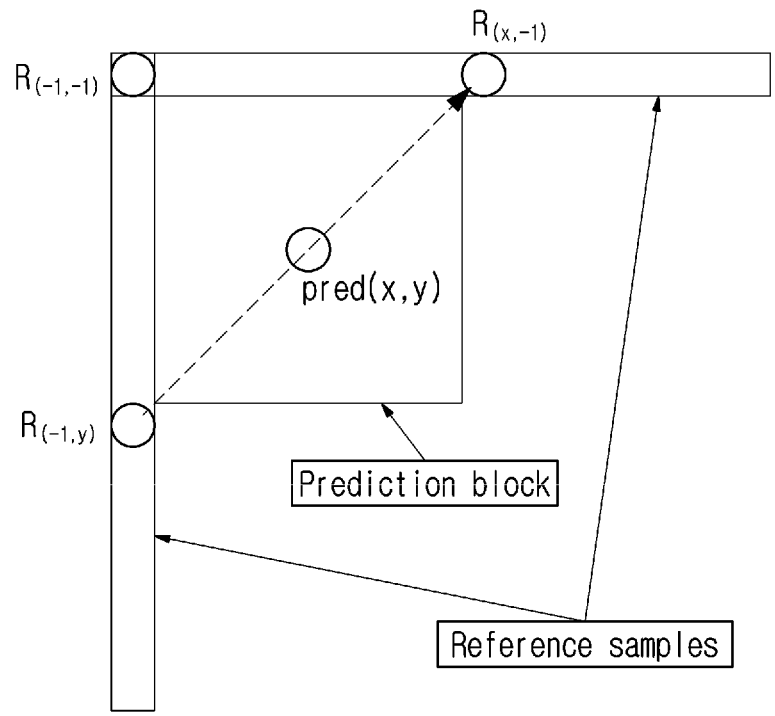
FIGS. 13A to 13D are views illustrating reference samples defined in PDPC.
Figure 13B:
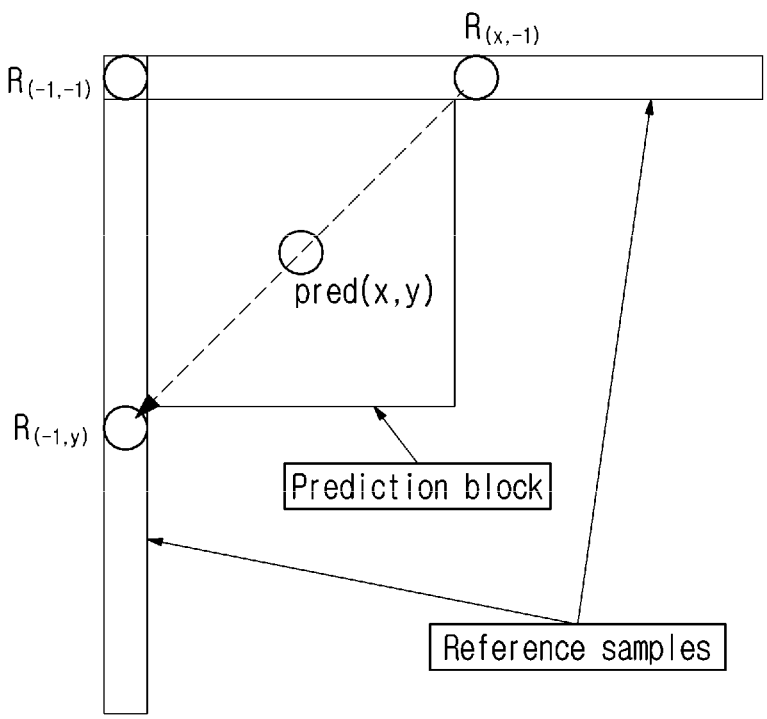
Figure 13C:
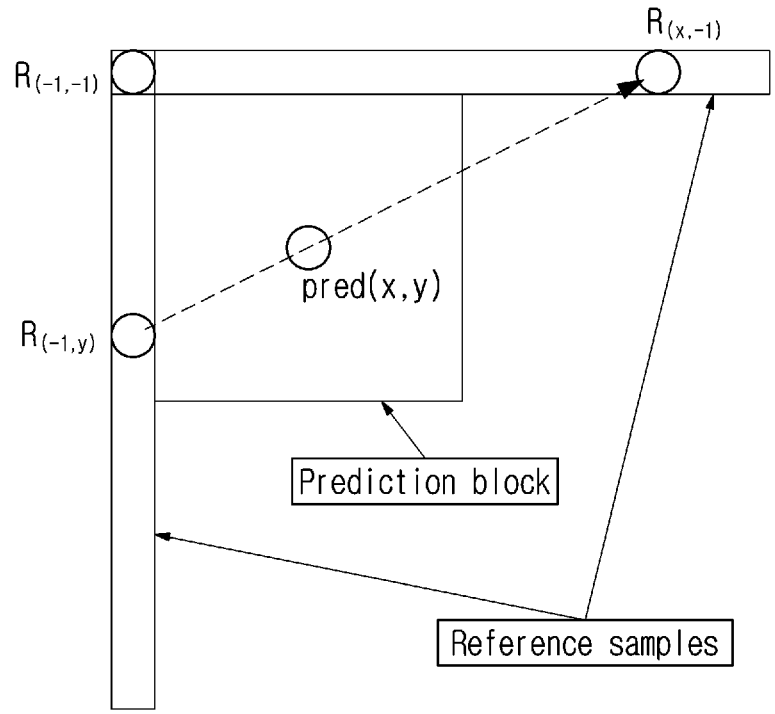
Figure 13D:
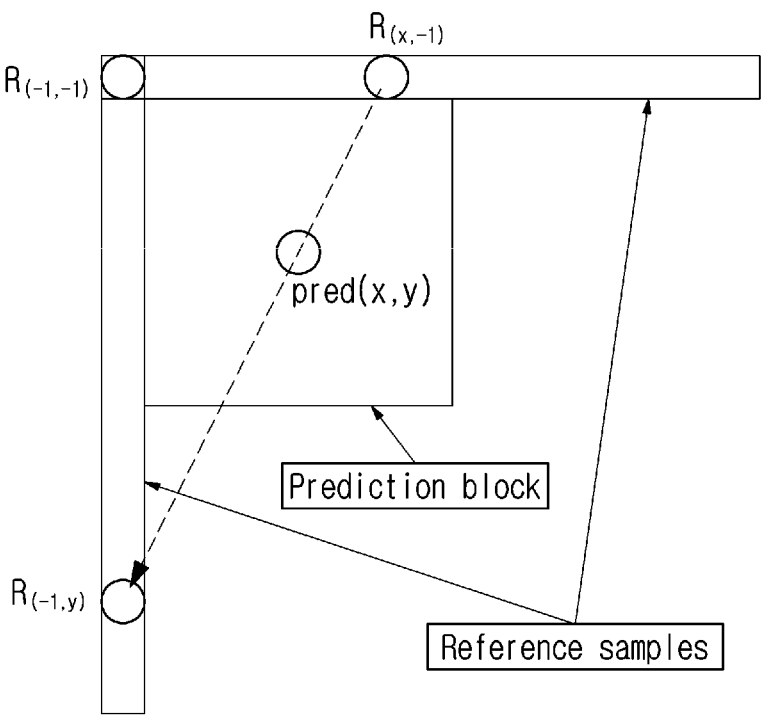

FIG. 13A shows reference samples ($R_{x,-1}$, $R_{-1,y}$, $R_{-1,-1}$) when the prediction mode is a diagonal top-right mode. FIG. 13B shows reference samples ($R_{x,-1}$, $R_{-1,y}$, $R_{-1,-1}$) when the prediction mode is a diagonal bottom-left mode. FIG. 13C shows reference samples ($R_{x,-1}$, $R_{-1,y}$, $R_{-1,-1}$) when the prediction mode is an adjacent diagonal top-right mode. FIG. 13D shows reference samples ($R_{x,-1}$, $R_{-1,y}$, $R_{-1,-1}$) when the prediction mode is an adjacent diagonal bottom-left mode. The weights of the PDPC may be derived based on prediction modes. Weights wT, wL and wTL of the PDPC may be derived as shown in Table 3 below.

TABLE 3

| Prediction mode | wT | wL | wTL |
|---|---|---|---|
| Diagonal top-right mode | 16 >> ( ( y << 1 ) >> shift) | 16 >> ( ( x << 1 ) >> shift) | 0 |
| diagonal bottom-left mode | 16 >> ( ( y << 1 ) >> shift ) | 16 >> ( ( x << 1 ) >> shift ) | 0 |
| Adjacent diagonal top-right mode | 32 >> ( ( y << 1 ) >> shift ) | 0 | 0 |
| Adjacent diagonal bottom-left mode | 0 | 32 >> ( ( x << 1 ) >> shift ) | 0 |

Position dependent intra prediction combination (PDPC) improves a prediction sample using a neighboring reference sample after generating a prediction sample using a reference sample according to a prediction mode. PDPC may be restrictively applied for a planar, DC, 2 (bottom-right direction mode), VDIA (top-left direction mode), Hor (horizontal direction mode), Ver (vertical direction mode), neighboring modes (mode #3 to mode #10) of the 2 mode, and neighboring modes (mode #58 to mode #65) of the VDIA mode, based on 65 directional intra prediction modes, instead of being applied for all intra prediction modes. In addition, instead of being applied for all prediction samples in a block to be currently encoded, it may be variably applied in consideration of the size of a block.

Multi-Reference Line (MRL) Intra Prediction

In conventional intra prediction, only neighboring samples of a first top reference sample line and neighboring samples of a first left reference sample line of a current block were used as reference samples for intra prediction. However, in a multiple-reference line (MRL) method, intra prediction may be performed using neighboring samples located on a reference sample line separated from the upper and/or left side of the current block by a distance of one or three samples.

FIG. 14 is a view illustrating a reference sample line available in an MRL method.

As shown in FIG. 14, at least one reference sample line of Reference line 0 to Reference line 3 in an order adjacent to a current block may be referenced for intra prediction of the current block. In the present disclosure, Reference line 0 may be referred to as a first reference sample line. In addition, Reference line 1 to Reference line 3 may be referred to as second to fourth reference sample lines, respectively.

When MRL is applied, a multi-reference line index (e.g., mrl_idx) specifying which reference sample line is used for intra prediction with respect to the current block may be signaled.

FIG. 15 is a view illustrating a syntax structure of a coding unit for signaling the multi-reference line index.

In the example shown in FIG. 15, the multi-reference line index may be signaled in the form of intra_luma_ref_idx. When the value of the multi reference index is greater than 0, it can be said that MRL is applied to a target block.

intra_luma_ref_idx of FIG. 15 may be used to specify a reference sample line index IntraLumaRefLineIdx[x0][y0] to be used for intra prediction of a current coding unit of (x0, y0) coordinate. When intra_luma_ref_idx[x0][y0] is not present in a bitstream, the corresponding value may be inferred as 0.

intra_luma_ref_idx may be referred to as an (intra) reference sample line index or mrl_idx. In addition, intra_luma_ref_idx may be referred to as intra_luma_ref_line_idx.

Table 4 below shows IntraLumaRefLineIdx[x0][y0] specified based on intra_luma_ref_idx[x0][y0].

TABLE 4

| intra_luma_ref_idx[ x0 ][ y0 ] | IntraLumaRefLineIdx[ x0 ][ y0 ] |
|---|---|
| 0 | 0 |
| 1 | 1 |
| 2 | 2 or 3 |

In the example shown in FIG. 15, a flag specifying whether MPM is applied to a current coding unit is intra_luma_mpm_flag[x0][y0], and, when the corresponding flag is not present in a bitstream, the value thereof may be inferred as 1. That is, it may be determined that MPM is applied to the current coding unit.

MRL may not be available for blocks of a first line (row) inside a CTU. For example, when a top boundary of a current coding unit is a top boundary of a CTU, MRL is not available for the current coding unit. This is to prevent extended reference lines located outside the current CTU from being used. In addition, as described below, when a reference sample line other than a first reference sample line is used, PDPC for the current coding unit may be not applied.

When an intra prediction mode of a coding unit to which MRL is applied is a DC mode, second and subsequent reference samples may be used to derive a DC value. In this case, instead of the reference sample of the first reference sample line, the DC value may be derived based on the reference sample of the second and subsequent reference sample lines.

In the present disclosure, information specifying a reference sample line in which intra prediction of the current block is used may be expressed as refIdx. For example, refIdx being 0 may specify a first reference sample line.

Embodiments of the present disclosure relate to the above-described PDPC. When the PDPC procedure is applied to intra prediction samples, filtered (modified) prediction samples may be generated.

An embodiment of the present disclosure proposes a method of performing PDPC in a chroma block having a specific condition when applying PDPC in intra prediction for a chroma component (block).

Existing PDPC determines whether to apply PDPC by applying different conditions according to a luma component block and a chroma component block.

FIG. 16 is a view illustrating PDPC application conditions according to an embodiment of the present disclosure.

According to the embodiment shown in FIG. 16, when the following conditions are all satisfied, PDPC may be applied to an intra-predicted prediction block of a current block.

(Condition 1) Both the width and height of the current block are greater than or equal to 4, the current block is a chroma block or a color component of the current block is a chroma component.

(Condition 2) Intra prediction is performed using a first reference sample line (refIdx==0) adjacent to the current block or the current block is a chroma block.

(Condition 3) Block difference pulse code modulation (BDPCM) is not applied to the current block.

(Condition 4) The intra prediction mode predModeIntra of the current block satisfies one of the following conditions.

predModeIntra is equal to INTRA_PLANAR
predModeIntra is equal to INTRA_DC
predModeIntra is less than or equal to INTRA_ANGULAR18
predModeIntra is greater than or equal to INTRA_ANGULAR50 and less than INTRA_LT_CCLM Condition 1 relates to the size of the current block. When the current block is a chroma block, Condition 1 is satisfied regardless of the size of the current block. In addition, in the case where the current block is a luma block, when the current block has a size of 4×4 or greater, Condition 1 is satisfied. In the present disclosure, the color component of the current block may be represented by cIdx. For example, when cIdx is 0, the current block is a luma component block and, when cIdx is not 0, the current block is a chroma component block.

Condition 2 relates to a reference sample line used for intra prediction. When the current block is a chroma block, Condition 2 is satisfied regardless of the reference sample line. In addition, in the case where the current block is a luma block, when intra prediction is performed using a first reference sample line adjacent to the current block, Condition 2 is satisfied.

Condition 3 relates to whether BDPCM is applied to the current block. Condition 3 may be determined based on BdpcmFlag of the current block. For example, when BdpcmFlag of the current block is 0, it may specify that BDPCM is not applied to the current block. BdpcmFlag of the current block may be determined based on a value signaled from a bitstream. When a current block is a luma (component) block, the value of BdpcmFlag may be derived based on the signaled intra_bdpcm_luma_flag. When the current block is a chroma (component) block, the value of BdpcmFlag may be derived based on the signaled intra_bdpcm_chroma_flag.

Condition 4 relates to the intra prediction mode of the current block. Specifically, when the intra prediction mode of the current block corresponds to one among 1) planar mode, 2) DC mode, 3) a directional mode less than or equal to mode #18 or 4) a directional mode greater than or equal to mode #50 and less than LT_CCLM, PDPC may be applied to the current block.

Table 5 is a table in which Condition 1 among the PDPC application conditions according to the embodiment shown in FIG. 16 is arranged according to the color component of the current block,

TABLE 5

|  | Luma component block | Chroma component block |
| --- | --- | --- |
| Condition 1 | width ≥ 4 && height ≥ 4 | No condition |

As shown in Table 5, if the current block is a luma block, Condition 1 is satisfied when both the width and height of the current block are greater than or equal to a predetermined threshold of 4. In this case, the predetermined threshold of 4 may be replaced with MIN_TB_SIZEY. MIN_TB_SIZEY may represent a minimum transform block (TB) size for a luma component, and the value thereof may be predetermined or signaled from the encoding apparatus to the decoding apparatus. In the embodiment shown in FIG. 16, for example, MIN_TB_SIZEY may be 4.

However, when the current block is a chroma block, Condition 1 of FIG. 16 is always satisfied. That is, the condition for the size of the current block is not applied. The condition for the size of the current block is applied only for the luma block of the current block but is not applied for the chroma block. In conclusion, the condition for the size of the current block among the PDPC application conditions may be differently applied according to the color component of the current block.

More specifically, when the current block is a chroma block and the size thereof is 2×2, 2×4, 4×2 or 2×N, intra prediction for a current chroma block is not performed. Accordingly, when the current block is a chroma block having the above size, PDPC is also not performed. In contrast, when the current block is an N×2 chroma block, intra prediction may be performed and thus PDPC may also be performed. Accordingly, when the current block is an N×2 block, PDPC is not performed in intra prediction of the luma block, but PDPC may be performed in intra prediction of the chroma block.

FIG. 17 is a view illustrating PDPC applications conditions according to another embodiment of the present disclosure.

According to the embodiment shown in FIG. 17, the condition for the size of the block among the PDPC application conditions may be equally applied for a luma block and a chroma block. Specifically, when the size of a current chroma block is N×2, a method of not performing PDPC may be provided.

In addition, according to the present disclosure, by unifying the PDPC application conditions for the luma block and the chroma block, simplified and unified intra prediction may be performed regardless of the color component of the current block.

According to the embodiment shown in FIG. 17, when the following conditions are all satisfied, PDPC may be applied to an intra-predicted prediction block of the current block.

(Condition 1-1) Both the width and height of the current block are greater than or equal to 4.

(Condition 2) Intra prediction is performed using a first reference sample line (refIdx==0) adjacent to the current block or the current block is a chroma block.

(Condition 3) BDPCM is not applied to the current block.

(Condition 4) The intra prediction mode predModeIntra of the current block satisfies one of the following conditions.

predModeIntra is equal to INTRA_PLANAR
predModeIntra is equal to INTRA_DC
predModeIntra is less than or equal to INTRA_ANGULAR18
predModeIntra is greater than or equal to INTRA_ANGULAR50 and less than INTRA_LT_CCLM Condition 1-1 above relates to the size of the current block. According to the embodiment shown in FIG. 17, when the current block has a size of 4×4 or greater, regardless of the color component of the current block, Condition 1 is satisfied. That is, when both the width and height of the current block are greater than or equal to a predetermined threshold (e.g., 4), Condition 1-1 is satisfied. When the width or height of the current block is less than a predetermined threshold, it may be determined that Condition 1-1 is not satisfied regardless of the color component of the current block. Accordingly, according to the embodiment shown in FIG. 17, in order to determine whether Condition 1-1 is satisfied, a determination of whether the color component of the current block is a luma component or a chroma component may be skipped.

Conditions 2 to 4 are the same as those described with reference to FIG. 16 and thus a repeated description thereof will be omitted.

According to the embodiment shown in FIG. 17, by commonly applying Condition 1-1 for the size of the current block among the PDPC application conditions to the luma block and the chroma block, a problem of applying PDPC to an N×2 chroma block may be solved.

The embodiment shown in FIG. 17 is technically characterized in that Condition 1-1 for the size of the current block is commonly applied for the luma block and the chroma block. Accordingly, in addition to Condition 1-1, all or some of Conditions 2 to 4 may be changed differently from the embodiment shown in FIG. 17. The changed PDPC application condition is a modification of the embodiment shown in FIG. 17 and may be included in the scope of the present disclosure.

FIG. 18 is a view illustrating PDPC application conditions according to another embodiment of the present disclosure.

According to the embodiment shown in FIG. 18, the condition for the size of a block and the condition for a reference sample line among the PDPC application conditions may be equally applied for the luma block and the chroma block. Specifically, according to the embodiment shown in FIG. 18, when the size of the current chroma block is N×2, a method of not performing PDPC may be provided. In addition, when a reference sample line used for intra prediction is not a first reference sample line, a method of not performing PDPC may be provided.

In addition, according to the present disclosure, by unifying the PDPC application conditions for the luma block and the chroma block, simplified and unified intra prediction may be performed regardless of the color component of the current block.

According to the embodiment shown in FIG. 18, when the following conditions are all satisfied, PDPC may be applied to an intra-predicted prediction block of the current block.

(Condition 1-1) Both the width and height of the current block are greater than or equal to 4.

(Condition 2-1) Intra prediction is performed using a first reference sample line (refIdx adjacent to the current block.

(Condition 3) BDPCM is not applied to the current block.

(Condition 4) The intra prediction mode predModeIntra of the current block satisfies one of the following conditions.
  predModeIntra is equal to INTRA_PLANAR
  predModeIntra is equal to INTRA_DC
  predModeIntra is less than or equal to INTRA_ANGULAR18
  predModeIntra is greater than or equal to INTRA_ANGULAR50 and less than INTRA_LT_CCLM Condition 1-1 are the same as those described with reference to FIG. 17 and thus a repeated description thereof will be omitted.

Condition 2-1 relates to a reference sample line used for intra prediction. According to the embodiment shown in FIG. 18, when intra prediction is performed using a first reference sample line adjacent to the current block, regardless of the color component of the current block, Condition 2-1 is satisfied. That is, when the first reference sample line is used for intra prediction of the current block, Condition 2 is satisfied. When the first reference sample line is not used for intra prediction of the current block, it may be determined that Condition 2-1 is not satisfied regardless of the color component of the current block. Accordingly, according to the embodiment shown in FIG. 18, in order to determine whether Condition 2-1 is satisfied, a determination of whether the color component of the current block is a luma component or a chroma component may be skipped.

Conditions 3 and 4 are the same as those described with reference to FIG. 16 and thus a repeated description thereof will be omitted.

According to the embodiment shown in FIG. 18, by commonly applying Condition 1-1 for the size of the current block among the PDPC application conditions to the luma block and the chroma block, problem of applying PDPC to an N×2 chroma block may be solved. In addition, by commonly applying Condition 2-1 for the reference sample line used for intra prediction of the current block among the PDPC application conditions to the luma block and the chroma block, the PDPC application conditions may be unified.

The embodiment shown in FIG. 19 is technically characterized in that Condition 1-1 for the size of the current block and Condition 2-1 for the reference sample line used for intra prediction is commonly applied for the luma component block and the chroma component block. Accordingly, in addition to Condition 1-1 and Condition 2-1, all or some of Conditions 3 and 4 may be changed differently from the embodiment shown in FIG. 18. The changed PDPC application condition is a modification of the embodiment shown in FIG. 18 and may be included in the scope of the present disclosure.

FIG. 19 is a view illustrating a method of generating a prediction block according to another embodiment of the present disclosure.

FIG. 19 embodies step of generating the prediction block by performing intra prediction, which may be performed to generate the prediction block in an image encoding apparatus and/or an image decoding apparatus. For example, in step S800 of FIG. 8 performed in the image encoding apparatus, each step of FIG. 19 may be performed. In addition, in step S1020 of FIG. 10 performed in the image decoding apparatus, each step of FIG. 19 may be performed.

When intra prediction is performed on a current block, a prediction block of the current block may be generated based on neighboring reference samples of the current block and an intra prediction mode (S1910). The prediction block generated in step S1910 may be modified depending on whether to apply PDPC and thus may be referred to as a temporary prediction block or a primary prediction block. In addition, the prediction block generated as a result of applying PDPC may be simply referred to as a prediction block or a final prediction block.

Therefore, whether PDPC is applied to the temporary prediction block or the primary prediction block may be determined (S1920). Step S1920 may be performed by determining whether a PDPC application condition is satisfied. The PDPC application condition according to the present disclosure has been described with reference to FIGS. 17 and 18. However, the PDPC application condition according to the present disclosure is not limited to the examples of FIGS. 17 and 18 and various modifications of the PDPC application condition may be included in the scope of the present disclosure, as described above.

As the result of step S1920, when the PDPC application condition is not satisfied, PDPC is not performed and the temporary prediction block (primary prediction block) generated in step S1910 may be used as the final prediction block of the current block.

As the result of determination of step S1920, when the PDPC application condition is satisfied, PDPC may be performed (S1930). In this case, by performing PDPC on the temporary prediction block (primary prediction block) generated in step S1910, the final prediction block of the current block may be generated.

PDPC of step S1930 may be performed, for example, according to the PDPC method described above.

The final prediction block of the current block generated according to the method of FIG. 19 may be used to generate a residual block of the current block or to reconstruct the current block along with the residual block of the current block (S1040).

According to the embodiment of the present disclosure, by setting the PDPC application condition independently of the color component of the current block, determination of the color component of the current block may be skipped and a process of determining whether to apply PDPC may be simplified. In addition, according to the embodiment of the present disclosure, simplified and unified determination of whether to apply PDPC application may be made.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 20:
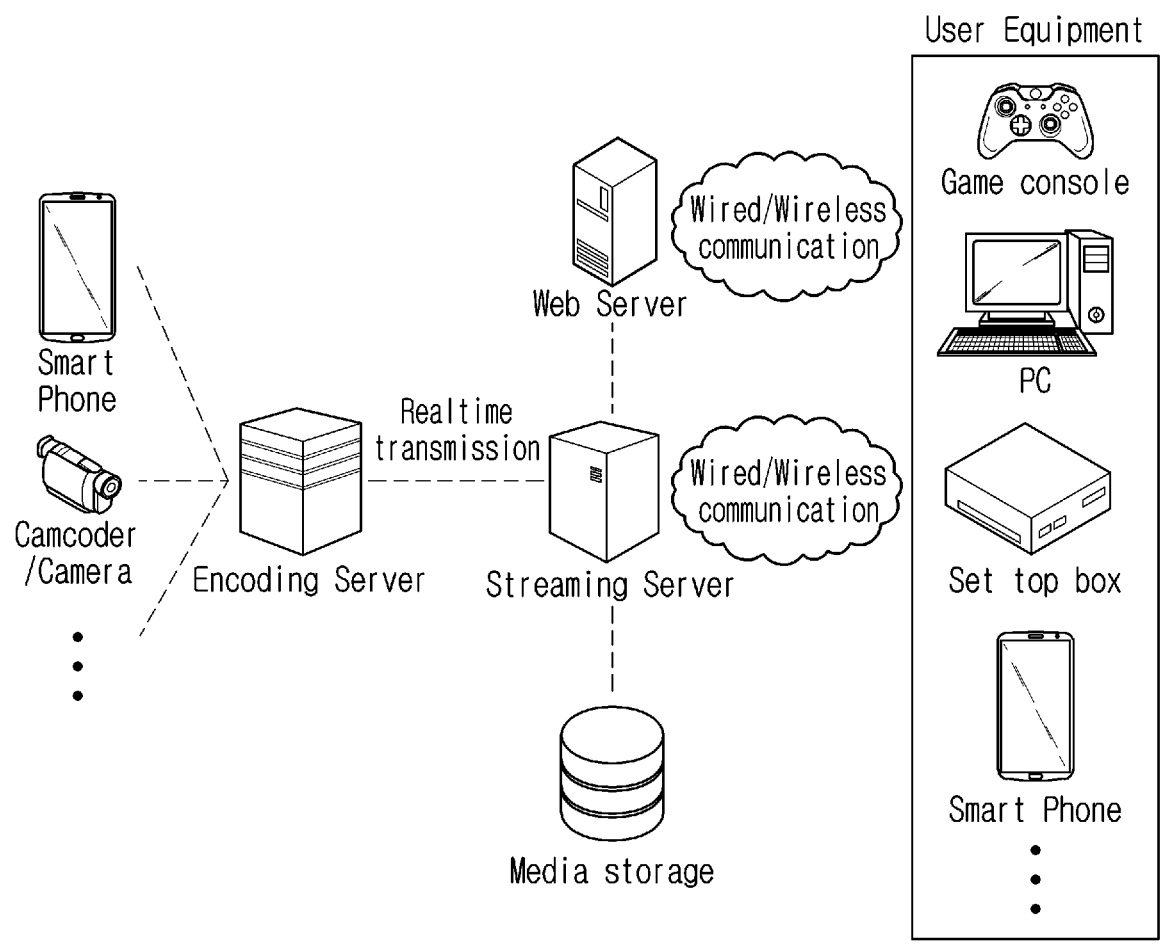
FIG. 20 is a view showing a content streaming system, to which an embodiment of the present disclosure is applicable.

FIG. 20 is a view showing a content streaming system, to which an embodiment of the present disclosure is applicable.

As shown in FIG. 20, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content are received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:

generating prediction samples by performing intra prediction on a current block;
determining whether to apply position dependent intra prediction combination (PDPC) to the prediction samples; and
generating final prediction samples of the current block, by applying PDPC to the prediction samples based on the determination,
wherein the determining whether to apply PDPC to the prediction samples comprises determining whether a size of the current block satisfies a predetermined condition,
wherein, based on a size of the current block satisfying a predetermined condition, it is determined to apply PDPC to the prediction samples,
wherein, based on the size of the current block doing not satisfy the predetermined condition, a determination of a color component of the current block is skipped and it is determined not to apply PDPC to the prediction samples,
wherein the predetermined condition is that a width of the current block is greater than or equal to 4 and a height of the current block is greater to or equal to 4, and
wherein, based on block difference pulse code modulation (BDPCM) being not applied to the current block, the current block being a chroma block and the intra prediction mode of the current block being an angular prediction mode having an index of 18 or less, it is determined to apply PDPC to the prediction samples.

2. The image decoding method of claim 1,
wherein, based on a reference sample line being a predetermined reference sample line, it is determined to apply PDPC to the prediction samples, and
wherein, based on the reference sample line being not the predetermined reference sample line, a determination of a color component of the current block is skipped and it is determined not to apply PDPC to the prediction samples.

3. The image decoding method of claim 2, wherein the predetermined reference sample line is a first reference sample line adjacent to the current block.

4. An image encoding method performed by an image encoding apparatus, the image encoding method comprising:
generating prediction samples by performing intra prediction on a current block;
determining whether to apply position dependent intra prediction combination (PDPC) to the prediction samples; and
generating final prediction samples of the current block, by applying PDPC to the prediction samples based on the determination,
wherein the determining whether to apply PDPC to the prediction samples comprises determining whether a size of the current block satisfies a predetermined condition,
wherein, based on a size of the current block satisfying a predetermined condition, it is determined to apply PDPC to the prediction samples,
wherein, based on the size of the current block doing not satisfy the predetermined condition, a determination of a color component of the current block is skipped and it is determined not to apply PDPC to the prediction samples,
wherein the predetermined condition is that a width of the current block is greater than or equal to 4 and a height of the current block is greater to or equal to 4, and
wherein, based on block difference pulse code modulation (BDPCM) being not applied to the current block, the current block being a chroma block and the intra prediction mode of the current block being an angular prediction mode having an index of 18 or less, it is determined to apply PDPC to the prediction samples.

5. The image encoding method of claim 4,
wherein, based on a reference sample line being a predetermined reference sample line, it is determined to apply PDPC to the prediction samples, and
wherein, based on the reference sample line being not the predetermined reference sample line, a determination of a color component of the current block is skipped and it is determined not to apply PDPC to the prediction samples.

6. A method of transmitting a bitstream generated by an image encoding method, the image encoding method comprising:
generating prediction samples by performing intra prediction on a current block;
determining whether to apply position dependent intra prediction combination (PDPC) to the prediction samples; and
generating final prediction samples of the current block, by applying PDPC to the prediction samples based on the determination,
wherein the determining whether to apply PDPC to the prediction samples comprises determining whether a size of the current block satisfies a predetermined condition,
wherein, based on a size of the current block satisfying a predetermined condition, it is determined to apply PDPC to the prediction samples,
wherein, based on the size of the current block doing not satisfy the predetermined condition, a determination of a color component of the current block is skipped and it is determined not to apply PDPC to the prediction samples,
wherein the predetermined condition is that a width of the current block is greater than or equal to 4 and a height of the current block is greater to or equal to 4, and
wherein, based on block difference pulse code modulation (BDPCM) being not applied to the current block, the current block being a chroma block and the intra prediction mode of the current block being an angular prediction mode having an index of 18 or less, it is determined to apply PDPC to the prediction samples.

7. A non-transitory computer-readable recording medium storing a bitstream generated by an image encoding method, the image encoding method comprising:
generating prediction samples by performing intra prediction on a current block;
determining whether to apply position dependent intra prediction combination (PDPC) to the prediction samples; and
generating final prediction samples of the current block, by applying PDPC to the prediction samples based on the determination,
wherein the determining whether to apply PDPC to the prediction samples comprises determining whether a size of the current block satisfies a predetermined condition,
wherein, based on a size of the current block satisfying a predetermined condition, it is determined to apply PDPC to the prediction samples,
wherein, based on the size of the current block doing not satisfy the predetermined condition, a determination of a color component of the current block is skipped and it is determined not to apply PDPC to the prediction samples, wherein the predetermined condition is that a width of the current block is greater than or equal to 4 and a height of the current block is greater to or equal to 4, and wherein, based on block difference pulse code modulation (BDPCM) being not applied to the current block, the current block being a chroma block and the intra prediction mode of the current block being an angular prediction mode having an index of 18 or less, it is determined to apply PDPC to the prediction samples.

* * * * *